(12) United States Patent
Daily et al.

(10) Patent No.: US 9,020,870 B1
(45) Date of Patent: Apr. 28, 2015

(54) RECALL SYSTEM USING SPIKING NEURON NETWORKS

(75) Inventors: Michael J. Daily, Thousand Oaks, CA (US); Michael D. Howard, Westlake Village, CA (US); Yang Chen, Westlake Village, CA (US); David W. Payton, Calabasas, CA (US); Rashmi N. Sundareswara, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 472 days.

(21) Appl. No.: 13/160,406

(22) Filed: Jun. 14, 2011

Related U.S. Application Data

(60) Provisional application No. 61/354,678, filed on Jun. 14, 2010.

(51) Int. Cl.
*G06E 1/00* (2006.01)
*G06E 3/00* (2006.01)
*G06F 15/18* (2006.01)
*G06G 7/00* (2006.01)
*B25J 9/00* (2006.01)
*G06N 3/02* (2006.01)

(52) U.S. Cl.
CPC .... *G06N 3/02* (2013.01); *B25J 9/00* (2013.01)

(58) Field of Classification Search
CPC ............. G06E 1/00; G06E 3/00; G06F 15/18; G06G 7/00; G06N 99/005; G06N 3/08
USPC .......................................... 706/20, 16, 15, 62
See application file for complete search history.

(56) References Cited

U.S. PATENT DOCUMENTS

2005/0234366 A1* 10/2005 Heinz et al. ................... 600/559

OTHER PUBLICATIONS

Izhikevich, "Polychronization: Computation with Spikes", Neural Computation 18, 245-282 (2006), 2005 Massachusetts Institute of Technology.*
Lazar et al, "Fading memory and time series prediction in recurrent networks with different forms of plasticity", Neural Networks 20 (2007) 312-322, 2007 Special Issue.*
Izhikevich et al, Oxford University Press 2004, all rights reserved, Cerebral Cortex Aug. 2004;14:933-944.*
Park, "Continuous Time Correlation Analysis Techniques for Spike Trains", A Thesis Presented to the Graduate School of the University of Florida in Partial Fulfillment of the Requirements for the Degree of Master of Science University of Florida 2007.*

(Continued)

*Primary Examiner* — Li-Wu Chang
*Assistant Examiner* — Ilya Traktovenko
(74) *Attorney, Agent, or Firm* — Tope-McKay & Associates

(57) ABSTRACT

Described is a recall system that uses spiking neuron networks to identify an unknown external stimulus. The system operates by receiving a first input signal (having spatial-temporal data) that originates from a known external stimulus. The spatial-temporal data is converted into a first spike train. A first set of polychronous groups (PCGs) are generated as a result of the first spike train. Thereafter, a second input signal originating from an unknown external stimulus is received. The spatial-temporal data of the second input signal is converted into a second spike train. A second set of PCGs are then generated as a result of the second spike train. Finally, the second set of PCGs is recognized as being sufficiently similar to the first set of PCGs to identify the unknown external stimulus as the known external stimulus.

18 Claims, 20 Drawing Sheets
(15 of 20 Drawing Sheet(s) Filed in Color)

(56) References Cited

OTHER PUBLICATIONS

Martinez et al, "Algorithms for Structural and Dynamical Polychronous Groups Detection", ICANN 2009, Part II, LNCS 5769, pp. 75-84, 2009.*
Izhikevich, "Polychronous Wavefront Computations", The Neurosciences Institute, 10640 John Jay Hopkins Drive, San Diego.*
Paugam-Moisy et al, "Delay Learning and Polychronization for Reservoir Computing", LIRIS, UMR CNRS 5205, Universit'e Lyon 2, France, Elsevier Dec. 26, 2007.*
Gutmann, "Learning reconstruction and prediction of natural stimuli by a population of spiking neurons", In proceeding of ESANN 2009, 17th European Symposium on Artificial Neural Networks Bruges, Belgium, Apr. 22-24, 2009.*
Hunter, et al, "Improving Associative Memory in a Network of Spiking Neurons", Artificial Neural Networks—ICANN 2008 18th International Conference, Prague, Czech Republic, Sep. 3-6, 2008, Proceedings, Part II.*
Wills, "Computation with Spiking Neurons", Clare College Cambridge A dissertation submitted in candidature for the degree of Doctor of Philosophy, University of Cambridge, Sep. 2004.*
Paugam-Moisy, "Spiking Neuron Networks a Survey", IDIAP-RR Feb. 6-11, 2006.*
Vertes et al, "Neural networks with small-world topology are optimal for encoding based on spatiotemporal patterns of spikes", Published: Jul. 13, 2009, BMC Neuroscience 2009, 10 (Suppl 1).*
Thorpe et al, "Spike-based strategies for rapid processing", Published in Neural Networks, 14(6-7), 715-726, 2001.*
Yang et al, "A Neuromorphic Depth-From-Motion Vision Model With STDP Adaptation", IEEE Transactions on Neural Networks, vol. 17, No. 2, Mar. 2006.*
Sumner et al, "A revised model of the inner-hair cell and auditory-nerve complex", Journal Acoustical Society of America, 111 (5), Pt. 1, May 2002.*
Maier et al, "A Minimal Model for the Study of Polychronous Groups", Dated, Mar. 27, 2008.*
Shahgoshtasbi, "A New Voice Recognition Topology Based on the Human Auditory Cortex", World Automation Congress (WAC) Jul. 24-26, 2006, Budapest, Hungary.*
Shahgoshtasbi, "Voice Recognition IC Based on the Human Auditory Cortex", Automation Congress, 2008, WAC 2008, Oate of Conference: Sep. 28, 2008-Oct. 2, 2008, pp. 1-9.*
A. Adami, et al. (2003) Modeling Prosodic Dynamics for Speaker Recognition, IEEE ICASSP.
A. Batliner and R. Huber (2007) Speaker Characteristics and Emotion Classification. In: Muller, C. (Ed.): Speaker Classification I, LNAI 4343, pp. 138-151.
T. Bocklet and E. Shriberg (2009). Speaker Recognition Using Syllable-Based Constraints for Cepstral Frame Selection, Proc. ICASSP, Taipei, Taiwan.
Bruce, C., Desimone, R. & Gross, C. Visual properties of neurons in a polysensory area in the superior temporal sulcus of the macaque. J. Neurophysiol. 46, 369-384 (1981).
L. Burget et al, Robust Speaker Recognition over Varying Channels. Report from JHU Workshop 2008. Accessed on Apr. 20, 2009. http://www.clsp.jhu.edu/workshops/ws08/documents/jhu_report_main.pdf.
J.P. Campbell, D.A Reynolds, R.B. Dunn (2003), Fusing High-and Low-Level Features for Speaker Recognition, In Proc. Eurospeech in Geneva, Switzerland, ISCA, pp. 2665-2668, Sep. 1-4, 2003.
S.P. Davis and P. Mermelstein (1980), Comparison of parametric representations for monosyllabic word recognition in continuously spoken sentences. IEEE ICASSP, 28(4): 357-366.
Doddington, G.; Speaker Recognition Based on Idiolectal Differences Between Speakers. (2001) In: Dalsgaard, P., Lindberg, B., Benner, H., Tan, Z. (eds.) Proc. EUROSPEECH, Aalborg, Denmark, pp. 2521-2524.
G. M. Edelman, Neural Darwinism: The theory of neuronal group selection. New York: Basic Books, 1987.

Elia Formisao, Federico De Martino, Millen Bonte and Rainer Goebel, "Who" is Saying "What"?Brain-Based Decoding of Human Voice and Speech, Science, vol. 322, Nov. 7, 2008.
T. Ganchev, N. Fakotakis, and G. Kokkinakis (2005), "Comparative evaluation of various MFCC implementations on the speaker verification task," in 10th International Conference on Speech and Computer (SPECOM 2005), vol. 1, pp. 191-194.
Gunduz, A. and Principe, J. C. 2009. Correntropy as a novel measure for nonlinearity tests. Signal Process. 89, (Jan. 1, 2009), 14-23.
S. Haeusler and W. Maass, A statistical analysis of information-processing properties of lamina-specific cortical microcircuit models, Cerebral Cortex, 17(1):149-162. 2006.
J.G. Harris, and I. Uysal (2009). "Biologically plausible speech recognition using spike-based phase locking." In Proc. of IEEE International Symposium on Circuits and Systems (ISCAS), Taipei, Taiwan.
Hermansky, H. and N. Morgan (1984). "Rasta Processing of Speech." IEEE Transactions on Speech and Audio 2: 578-589.
Iannella, N. Back, A., "A spiking neural network architecture for nonlinear function appoximation," Neural Networks for Signal Processing IX, 1999. Proc. of the 1999 IEEE Signal Processing Society Workshop, Aug. 1999, p. 139-146.
Izhikevich, Eugene M. (2006) "Polychronization: Computation with Spikes", Neural Computation 18, 245-282.
Jhuang, H.; Serre, T.; Wolf, L.; Poggio, T.; "A Biologically Inspired System for Action Recognition," Coputer Vision, 2007., IEEE 11th International Conference on, Oct. 14-21, 2007 pp. 1-8.
S. S. Kajarekar, N. Scheffer, M. Graciarena, E. Shriberf, A. Stolcke, L. Ferrer, & T. Bocklet (2009), The SRI NIST 2008 Speaker Recognition Evaluation System. To appear In Proc. IEEE ICASSP, Taipei. (PDF).
P. Kanerva, "Sparse Distributed Memory and Related Models," In M.H.Hassoun, ed., Associative Neural Memories: Theory and Implementation, pp. 50-76. New York: Oxford University Press, 1993.
P. Knusel, R.Wyss, P. Konig, and P. Verschure (2004), "Decoding a Temporal Population Code," Neural Computation 16, 2079-2100.
Lindsey, B. G.,Morris, K. F., Shannon, R., & Gerstein, G. L., (1997). Repeated patterns of distributed synchrony in neuronal assemblies. J. Neurophysiol., 78. 1714-1719.
S. Loiselle, J. Rouat, D. Pressnitzer, & S. Thorpe (Jul. 31-2005-Aug. 4, 2005). Exploration of Rank Order Coding with Spiking Neural Networks for Speech Recognition. Paper presented at the Proceedings of International Joint Conference on Neural Networks, Montreal, Canada.
Maass, W., T. Natschl, and H. Markram, "A Model for Real-Time Computation in Generic Neural Microcircuits," in NIPS 15, 2001.
Maass, Wolfgang; Natschlager, Thomas; and Markram, Henry (2002). "Real-time computing without stable states: a new framework for neural computation based on perturbations". Neural Computation 14 (11): 2531-60.
Maass, Wolfgang: Markram, Henry, "On the Computational Power of Recurrent Circuits of Spiking Neurons", Journal of Computer and System Sciences 69 (4): 593-616, 2004.
Maier, W and B. Miller, "A Minimal Model for the Study of Polychronous Groups," arXiv:0806. 1070v1, 2008.
Martinez, R. and H. Paugam-Moisy, "Algorithms for Structural and Dynamical Polychronous Groups Detection," C.Allippi et al. (Eds.), ICANN 2009, Part II, LNCS 5769, pp. 75-84, 2009.
R. Meddis (1986), "Simulation of mechanical to neural transduction in the auditory receptor," J. Acoust. Soc. Am., vol. 79, pp. 702-711.
R. Meddis (1988) Simulation of auditory-neural transduction: Further Studies. J. Acoust. Soc. Am. 83, 1056-1063.
K. Sri Rama Murty and B. Yegnanarayana, "Combining Evidence From Residual Phase and MFCC Features for Speaker Recognition" IEEE Signal Processing Letters, vol. 13, No. 1, Jan. 2006.
A.S. Naini and M.M. Homayounpour (2006) Speaker Age interval and sex identification based on Jitters, Shimmers and Mean MFCC using supervised and unsupervised discriminative classification methods. IEEE ICSP 2006.
Newman, M., et al. (1996). "Speaker Verification through Large Vocabulary Continuous Speech Recognition." ICSLP.
The NIST Year 2008 Speaker Recognition Evaluation Plan, http://www.itl.nist.gov/iad/mig/tests/sre/2008/sre08_evalplan_release4.pdf.

(56) References Cited

OTHER PUBLICATIONS

A Oliveri, R Rizzo, A Chella, "An Application of Spike-Timing-Dependent Plasticity to Readout Circuit for Liquid State Machine," IJCNN 2007, International Joint Conference on Neural Networks, Aug. 12-17, 2007, pp. 1441-1445.

H. Paugam-Moisy, R. Martinez, and S. Bengio (2008), "Delay learning and polychronization for reservoir computing," Neurocomputing, 71, 1143-1158.

Pelecanos, J. and S. Sridharan (2001). Feature Warping for Robust Speaker Verification. 2001: A Speaker Odyssey: The Speaker Recognition Workshop, Crete, Greece.

S. Schotz and C. Muller. A Study of Acoustic Correlates of Speaker Age In: Muller, C. (Ed.). Speaker Classifcation II, LNCS (LNAI), vol. 4441, Springer-Heidelberg, 2007.

T. Serre, L. Wolf, and T. Poggio, Object Recognition with Features Inspired by Virtual Cortex, Computer Vision and Pattern Recognition, IEEE Conf. 2005.

Guangji Shi, Maryam Modir Shanechi, and Parham Aarabi, "On the Importance of Phase in Human Speech Recoginition," IEEE Transactions on Audio, Speech, and Language Processing, vol. 14, No. 5, Sep. 2006.

Singer, W., & Gray, C. M. (1995). Visual feature integration and the temporal correlation hypothesis. Annual Review of Neuroscience, 18, 555-586.

M.D. Skowronski and J.G. Harris (2007). "Noise-robust automatic speech recognition using a predictive echo state network" IEEE Transactions on Audio, Speech and Language Processing, 15(5):1724-1730.

M.D. Skowronski and J.G. Harris (2007). "Noise-robust automatic speech recognition using a discriminative echo state network." In Proc. of IEEE International Symposium on Circuits and Systems (ISCAS), pp. 1771-1774, New Orleans, LA.

K. Somnez et al (1998) A log-normal model of pitch for prosody-based speaker recognition. Eurospeech. Rhodes, Greece.

Song, S., Miller, K. D., & Abbott, L. F. (2000). Competitive Hebbian learning through spike-timing-dependent synaptic plasticity. Nature Neurosci., 3, 919-926.

Y.Cho, N. Srinivasa and L. Bajaras. (2006) Liquid State Machines and its Application to Prediction of Multi-Fault Occurrences in Manufacturing Plants. GM R&D Internal Collaborative Gray Report, Dec. 12, 2006.

C. J. Sumner. and E. A. Lopez-Poveda, "A revised model of the innter hair cell and auditory-nerve complex," J. Acoust. Soc. Am., vol. 111, No. 5, pp. 2178-2188, 2002.

C. J. Sumner, E. A. Lopex-Poveda, L. P. O'Mard, and R. Meddis, "Adaptation in a revised inner-hair cell model," J. Acoust. Soc. Am., vol. 113, No. 2, pp. 893-901, 2003.

Thomas M. Talavage, Martin I. Sereno, Jennifer R. Melcher, Patrick J. Ledden, Bruce R. Rosen and Anders M. Dale, "Tonotopic Organization in Human Auditory Cortex REvealed by Progressions of Frequency Sensitivity," Journal of Neurophysiology 91:1282-1296, 2004.

T'ur, G., Shriberg, E., Stolcke, A., Kajarekar, S. (2007) Duration and Pronunciation Conditioned Lexical Modeling for Speaker Verification, In: Proceedings of Interspeech, Antwerp, Belgium.

Ungerleider, L. & Haxby, J. 'What' and 'where' in the human brain. Curr. Opin. Neurobiol. 4, 157-165 (1994).

Uysal, H. Sathyendra, and J.G. Harris. A duplex theory of spike coding int he early stages of the auditory system. In Proc. of IEEE International Conference on Acoustics, Speech and Signal Processing (ICASSP), vol. IV, pp. 733-736, Honolulu, Hawaii, Apr. 2007.

Uysal, H. Sathyendra, and J.G. Harris, Spike-based feature extraction for noise robust speech recognition using phase synchrony coding. In Proc. of IEEE International Symposium on Circuits and Systems (ISCAS), pp. 1529-1532, New Orleans, LA, May 2007.

D. Verstraeten, , B. Schrauwen, D. Stroobundt and J. Van Campenhout, Isolated word recognition with the Liquid State Machine; a case study, Information Processing Letters, vol. 95, Issue 6, Sep. 30, 2005, pp. 521-528.

Wikipedia, http://en.wikipedia.org/wiki/Levenshtein_distance, 2009.

C. M. Wessinger, VanMeter, B. Tian, Van Lare, Pekar, and P. Rauschecker, Hierarchical Organization of the Human Auditory Cortex Revealed by Functional Magnetic Resonance Imaging. J. of Cognitive Science, Jan. 1, 2001, vol. 13, No. 1, pp. 1-7.

Y. Xue, L. Yang, and S. Haykin. Decoupled echo state networks with lateral inhibition. IEEE Neural Networks, 10(10), 2007.

Y. Yu, A. Schwartz, J.G. Harris, M. Slaney, and S-C Liu, "Periodicity detection and locatlization using spike timing from the AER ear," In Proc. of IEEE International Symposium on Circuits and Systems (ISCAS), Taipei, Taiwan, May 2009.

Raichelgauz, I., Odinaev, K., & Zeevi, Y. Y. (2006), Natural signal classification by neural cliques and phase-locked attractors. Conference Proceedings of the International Conference of IEEE Engineering in Medicine and Biology Society, Suppl. 6693-6697.

\* cited by examiner

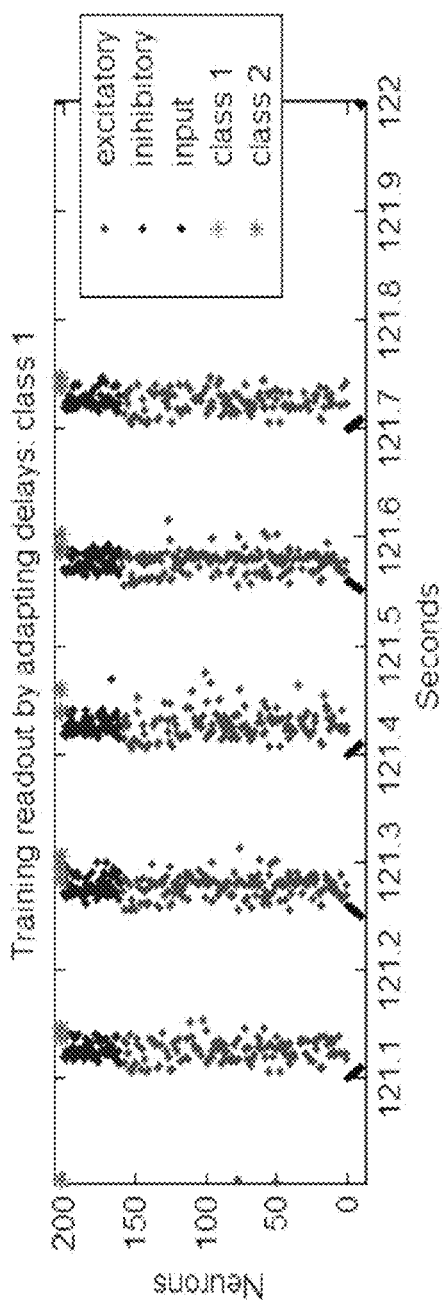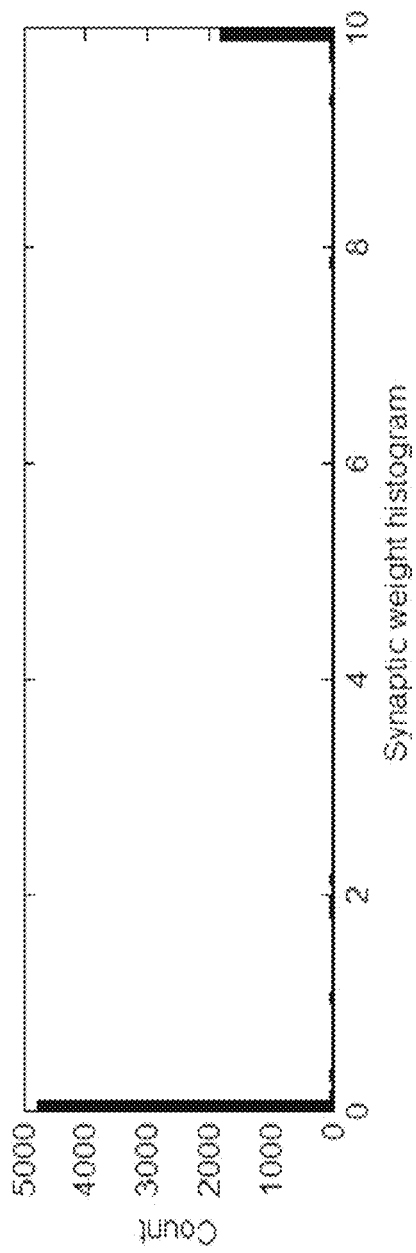

|  | Phrase 1 "zero" | Phrase 2 "three" | Inter-section |
|---|---|---|---|
| speaker1: | 402 | 369 | 43 |
| speaker2: | 692 | 784 | 137 |
| Intersection | 60 | 84 | |

Union of intersection of PCG's: 97
intersection speaker1 / phrase1: 6
intersection speaker1 / phrase2: 9
intersection speaker2 / phrase1: 16
intersection speaker2 / phrase2: 14

FIG. 19

RECALL SYSTEM USING SPIKING NEURON NETWORKS

PRIORITY CLAIM

This is a non-provisional patent application of U.S. Provisional Application No. 61/354,678, filed on Jun. 14, 2010, entitled, "Hierarchical Polychronous Spiking Memory."

FIELD OF INVENTION

The present invention relates to a recall system and, more particularly, to a recall system that uses spiking neuron networks to recall and identify an external stimulus.

BACKGROUND OF INVENTION

The present invention is related to a recall system using spiking neuron networks that generate polychronous groups (PCGs). The whole concept of polychronization is very new as there is very little research on PCGs and the use of PCGs as a type of memory. The theoretical potential is quickly understood within the computational neural science community; however, no one previously understood how to make use of such a huge memory capability for practical application. By way of example, Paugam-Moisy, Martinez, and Bengio, in "Delay Learning and Polychronization for Reservoir Computing", NeuroComputing 71 (2008), pp. 1143-1158, mentioned PCGs, but the authors did not use them.

Thus, a continuing need exists for a system that employs the huge memory capability of PCGS in a fast and efficient recall system.

SUMMARY OF INVENTION

The present invention is directed to a recall system that uses spiking neuron networks to identify an unknown external stimulus. The recall system includes one or more processors and a memory, with the memory storing computer code which, when executed by the one or more processors, cause the one or more processors to perform the operations described herein. For example, the system receives a first input signal (having spatial-temporal data) originating from a known external stimulus. The spatial-temporal data is converted into a first spike train. The first spike train is received in a spiking neuron network that generates a first set of polychronous groups (PCGs) as a result of the first spike train.

Thereafter, a second input signal (having second spatial-temporal data) originating from an unknown external stimulus is received. The second spatial-temporal data is converted into a second spike train, with the spike train then received by the spiking neuron network. The spiking neuron network generates a second set of PCGs as a result of the second spike train. Finally, the second set of PCGs is recognized as being sufficiently similar to the first set of PCGs to identify the unknown external stimulus as the known external stimulus.

In converting the spatial-temporal data into a first spike train, a spatial component is represented by multiple channels that can carry spikes to neurons in a first layer of the spiking neuron network. A temporal component is represented by a timing of the spikes coming out of each channel, such that the timing of the spikes, a number of the spikes, and a location of each channel together encode the input signal into the first spike train.

In another aspect, the system is operable for training a first layer of the readout neural network by pre-training with a random thalamic input and training with the first input signal originating from the known external stimulus. Pre-training allows synaptic weights to settle based on random network connections that are present. Further, training with the first input signal causes the synaptic weights to refine in response to the first input signal until the synaptic weights have a bimodal distribution in which weights concentrated at a maximum as a result of the pre-training migrate to a minimum, and where a histogram of synaptic weights becomes stable.

In another aspect, the act of recognizing the second set of PCGs as being sufficiently similar to the first set of PCGs is performed by a readout neural network.

In yet another aspect, in converting the spatial-temporal data into a first spike train, a Meddis hair-cell model is used to convert the first input signal into frequency-specific spike patterns that are then combined based on a degree of synchrony to generate the first spike train.

Further, in receiving the first spike train in the spiking neuron network, the spiking neuron network is a hierarchical network, with a first layer having neurons that are tonotopically organized, such that spike trains from individual frequency bands are routed to neurons in the first layer according to the frequency bands to generate an initial group of PCGs, with the initial group of PCGs becoming an input to an upper layer in the hierarchical network to generate the first set of PCGs.

Finally, the present invention is also directed to a computer program product and corresponding computer implemented method. The computer program product comprises computer-readable instructions stored on a non-transitory computer-readable medium that are executable by a computer having a processor for causing the processor to perform the operations listed herein. Alternatively, the method comprises acts of causing a computer to perform said operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 4A is a graph illustrating neurons that fired in an entire network;

FIG. 4B is a graph illustrating results of training steps;

FIG. 19 depicts a table illustrating a number of PCG's active for each speaker, indicating good strong overlaps for things that are known to be in common but poor overlaps for things that are not in common.

DETAILED DESCRIPTION

Figure 1:
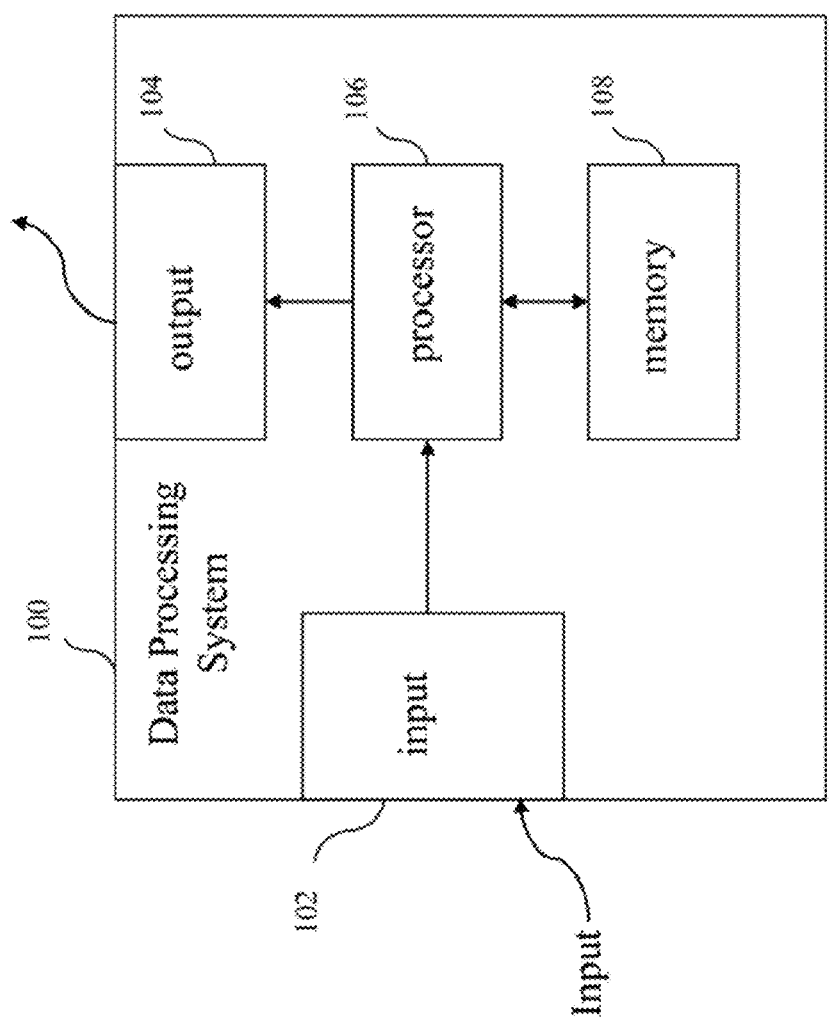
FIG. 1 is a block diagram depicting the components of a recall system of the present invention.

The present invention relates to a recall system and, more particularly, to a recall system that uses spiking neuron networks to recall and identify an external stimulus. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, a description of various principal aspects of the present invention is provided. Subsequently, an introduction provides the reader with a general understanding of the present invention. Finally, specific aspects of the present invention are provided to give an understanding of the specific details that are embodied by the present invention.

(1) Principal Aspects

The present invention has three "principal" aspects. The first is recall system. The recall system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored in the memory of a computer or on a computer-readable medium such as a floppy disk, a CD-ROM, and a flash drive. These aspects will be described in more detail below.

A block diagram depicting the components of a recall system of the present invention is provided in FIG. 1. The recall system 100 comprises an input 102 for receiving an input signal. Note that the input 102 may include multiple "ports." Typically, input is received from at least one sensor, non-limiting examples of which include audio and/or video sensors. An output 104 is connected with the processor for providing information regarding signal to a user or to other systems in order that a network of computer systems may serve as recall system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
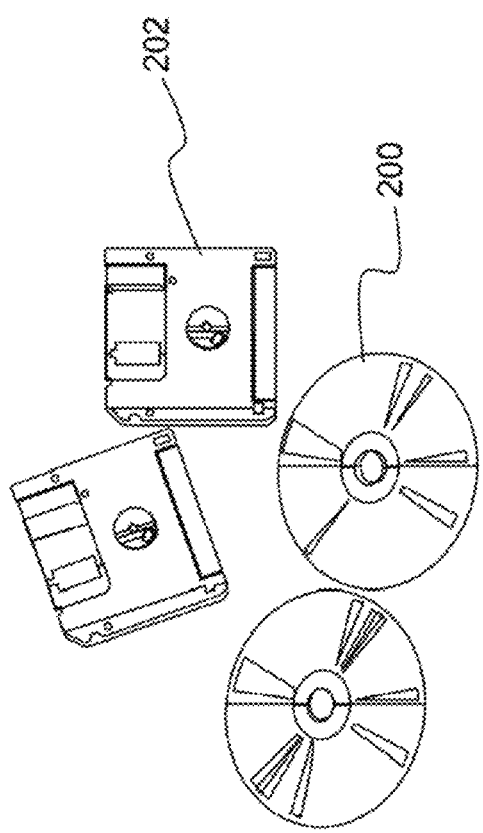
FIG. 2 is an illustration of a computer program product embodying the present invention.

An illustrative diagram of a computer program product embodying the present invention is depicted in FIG. 2. Although not limited thereto, the computer program product is depicted as an optical disk 200 such as a CD or DVD or a floppy disk 202. However, as mentioned previously, the computer program product generally represents computer-readable instructions stored on any compatible non-transitory computer-readable medium, non-limiting examples of which include hard drives, flash drives, etc.

(2) Introduction

The present invention provides a method and system capable of learning input patterns, memorizing, recalling and recognizing previously learned patterns. The system uses a spiking neural network coupled with a readout network, along with algorithmic procedures for conditioning and training the networks. The system is based on a finding in computational neural science called "polychronization" in which a group of neurons (called polychronous group or PCG) fires in precise and repeatable time-locked patterns in response to input stimulus.

Due to their precise and repeatable patterns, the present invention uses the PCGs as the basis of the memory of the recall system. An advantage of using PCGs is because a network of size N can have N! (N-factorial) number of PCGs in theory. Another unique aspect is in the way the memory can be "readout" or recalled in such neural networks by designing a readout network that is fully connected to the neuron population.

Because of the potential huge memory capacity afforded by the polychronization in spiking neural networks, the present invention can be used to create miniature intelligent memory devices for such applications as portable speech recognition, speaker identification and face recognition. These miniature memory devices will be easy to train, take up very small space and consume very little power, compared with current state-of-art devices based on conventional computer technology.

Thus, the use of a pattern-based memory with high capacity and real-time recall has the potential to provide human-like performance in a wide range of applications where current programmable machines have failed or been too limited. Because pattern-based episodic memory is the key method by which humans make sense of and react to their environment (as well as learn new concepts), there are applications in robotics, manufacturing, intelligence analysis, encryption, autonomous driving, and prognostics. For example, in the case of a driver's assistant, the memory system can alert a distracted driver of pedestrians at an intersection faster than a human.

(3) Specific Aspects of the Invention

Figure 3:
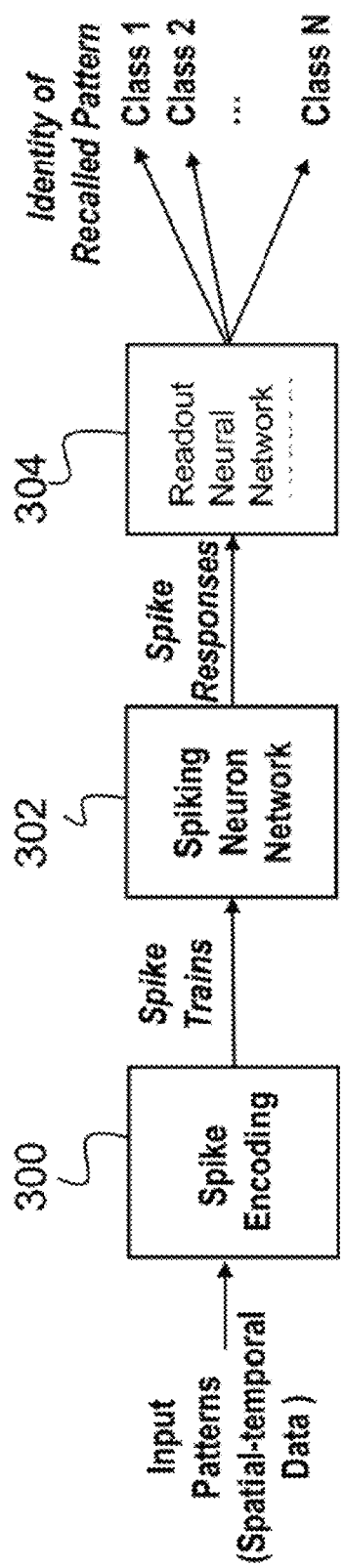
FIG. 3 is a flow chart depicting components of a recall system according to the present invention.

As noted above, the present invention is directed to a spiking neural network based memory and recognition system. As shown in FIG. 3, the system includes an input spike encoder 300, a spiking neural (or neuron) network (SNN) 302, and a readout neural network 304.

A motivation of the current invention is to design a high-capacity memory device and a recall circuitry using a SNN model that can implemented in hardware (such as VLSI chips) directly, as opposed to algorithms running on general-purpose computers. With such a design, the device can be implemented and operated in very small packages and low power consumptions, enabling a variety of applications requiring memory recall and other recognition capabilities, such as portable speaker identification systems and portable face recognition systems.

The current invention is endowed with high-capacity memory and excellent recall capability because it utilizes a newly discovered phenomenon in computational neural science called polychronization, which has been theorized to be the underlying principle of memory and learning in human brains. Polychronization was described by Izhikevich, E., in "Polychronization: Computation with Spikes", Neural Computation (2006) 18:245-282, which is incorporated herein by reference.

The polychronization theory says a group of neurons in the SNN can fire in precise time-locked patterns in response to external stimuli (input), and these time-locked firing patterns can form due to exposure to external stimuli through a learning process called STDP (spike-time dependent plasticity) within the network without any supervision. Once learned, these firing patterns can be recalled (reactivated) when the same or similar external stimuli are reintroduced (recall). The groups of neurons thus formed are called polychromous groups (PCGs). As noted in the introduction above, a SNN with N neurons can have N! (N factorial) number of PCGs, and, therefore, has huge memory potentials. The present invention prescribes a procedure in training a SNN 302 using external stimuli so that a network of neurons can achieve its full potential in learning and memorizing the inputs.

An equally important element is that of the readout neural network 304. Once the SNN 302 has learned and remembers the external stimuli by forming PCGs as a representation, a mechanism is required to identify, recognize or translate the neuronal activities corresponding to the PCGs into the true identities that the stimuli represent. The readout neural network 304 is designed to accomplish this task. It has a layer of output neurons, one for each potential input class (or identity). Each of these output neurons is fully connected with the neurons in the first layer SNN 302 with variable conduction delays that are trained during readout training. The current invention describes a fast supervised training, for the readout neural network 304 for accurate recall of memorized input patterns in the SNN 302.

Last but not least is the spike encoder 300 module. Since the SNN 302 represents information by spikes (electrical impulses similar to those found in neural networks in human brains), input patterns used as external stimuli (such as speech signals and images) must be converted to a series of spikes that encode the information in the original input stimuli. The conversion process can follow processes found in biological systems or by other mechanisms (examples will be described later). One important aspect is that the spikes generated from the spike encoder 300 inherently carries spatial and temporal information, therefore they are well suited for representing all types of spatial-temporal input patterns that the memory device is designed to learn and memorize. For further understanding, each of the modules is described in further detail below.

(4.1) Spike Encoding

Each input pattern used to train and test the system must first be converted to spikes by the input spike encoder 300. Thus, the spike encoder 300 receives an input signal (having spatial-temporal data) originating from a known external stimulus and converts the spatial-temporal data into a first sequence of spikes.

The spikes have both spatial and temporal components. The spatial component is represented by the multiple channels that can carry spikes to the neurons in the first layer. The temporal component is represented by the timing of the spikes coming out of each channel. The timing of the spikes, the number of the spikes, and the location of channel together will encode each specific input.

As an example, an image having M pixels can be encoding as having M channels, each is able to produce a single spike with delays with respect to the reference time (pattern presentation time) that is proportional to the pixel's brightness value. As a non-limiting example, a quantization of 16 grayscale is used. That translates to 16 different delay values depending on pixel value with an increment of 1 millisecond (ms). The brightest pixels will generate the spikes with the shortest amount of delay (0 ms), while the darkest pixels do not generate spikes at all.

The input spikes are routed to the neurons in the first layer of the network. The way the connections are made is through random assignment. Typically, each channel has a 1% chance of having a connection to a neuron, as described by Paugam-Moisy et al. in "Delay Learning and Polychronization for Reservoir Computing," NeuroComputing 71 (2008), pp. 1143-1158. For a 100-neuron network, that translates to approximately 1 neuron for each channel (randomly chosen among all neurons in the first layer). This number can be referred to as "nConnect". nConnect can be adjusted depending on the type of inputs and on the size of the neuron population in the first layer. A typical number for nConnect is 1 or 2 for a small network with 100 to 200 neurons. For larger networks, using the percentage criteria (such as 1% mentioned above) will be more appropriate.

(4.2) Spiking Neuron Network

The present invention includes a spiking neuron network 302 that receives the sequence of spikes from the spike encoder 300. The SNN 302 generates a set of polychronous groups (PCGs) as a result of the sequence of spikes. The system learns the PCG regularity in external stimuli via STDP.

The present invention can be applied to any neural network capable of learning via STDP and equipped with variable conduction delays in synaptic connections between neurons. As a non-limiting example, a 2-layer network (SNN+the readout) can be used where the first layer consists of 100 neurons. For example, Izhikevich's model can be used as the Izhikevich model can simulate a variety of neuron types with very few parameters, it is very efficient in computer simulation, and is suitable for hardware implementation (see Izhikevich, E., in "Polychronization: Computation with Spikes", Neural Computation (2006) 18:245-282). In this example, 80 of the neurons are excitatory and 20 are inhibitory, maintaining a 4:1 ratio as found in biological brains. 10 readout neurons are used in the second layer representing the 10 classes that are desirably recognized. These 10 readout neurons are also Izhikevich model neurons. Each neuron in the first layer has 60 links to post-synaptic neurons, whereas those in the second layer do not have any post-synaptic links. These post-synaptic links are chosen randomly among the entire neuron population in the first layer. In a 200-neuron (160 excitatory and 40 inhibitory) configuration, the number of post-synaptic link is reduced to 55. In general, the number of post-synaptic links should be 10% of the number of neurons for large number of neurons, but it has been found that for small networks, this number must be raised in order to achieve an adequate firing rate. The neurons from the first layer are fully connected to each of the readout neurons in the second layer and the links are all excitatory.

The excitatory links from the neurons in the first layer carry an initial weight (i.e., synaptic strength) of 6 (milli-volts or mv). These weights can change during the initial training periods via STDP between 0 and 10 my. Inhibitory links carry a weight of −5 and are fixed. Excitatory links from the first layer into the readout neurons of the second layer carry a weight of 1.5. Since the first layer is fully connected to the second, the weight is reduced compared with a typical excitatory link to reduce the chance of unwanted multiple firings at the readout neurons. The delays in the first layer are randomly chosen between 1 and 20 ms and are fixed. Delays from the first layer to the readout layer can be between 1 and 40 ms as a result of training. The initial values of these delays can be either uniform (e.g., 20 ms) or random (e.g., N(20,2) in ms).

It should be noted that as alternative to the spiking neuron network described above, the network can be formed such that it is hierarchical, using hierarchical polychromous spiking memory. Details regarding the hierarchical polychromous spiking memory are provided further below.

(4.3) Readout Neural Network

As described above, the present invention describes a fast supervised training for the readout neural network 304 for accurate recall of memorized input patterns in the SNN 302. This recall requires a training procedure. Described below is the training procedure that allows the system to remember or learn the input patterns. The description of the training is divided into three categories: 1) "STDP Training" which describes training of the first layer network; 2) "Training the Readout" which describes training the readout mechanism by adjusting delays; and 3) "Testing" which describes the recall and test procedure.

(4.3.1) STDP Training

The training procedure is specially designed so that polychronous groups (PCGs) can be formed in response to the external input and also for the readout mechanism to be trained faster. This is important because it is desirable to have the formation of different PCGs in response to each input. With that in mind, the network is trained so that the excitatory synaptic weights of the network form a bimodal distribution. Formation of a bimodal distribution is an important indication of forming an effective network structure with stable PCGs as memory representation of the input stimuli. This in turn helps develop an effective readout. The formation of stable PCGs means the network has "memorized" the characteristics of the input stimuli which can be easily recalled or activated when the same or similar stimuli are presented.

The training procedure consists of two steps: (1) Pre-training with random thalamic input, and (2) Training with a desired input.

With respect to Step One, pre-training of the neural network allows the synaptic weights to settle based on the specific (random) network connections that are present. Since the synaptic weights AND connections are chosen randomly, there is no structure to speak of. The pre-training period will bring the network out of this randomness, and into a state where the network exhibit certain behaviors observed in human brains, such as alpha and gamma firing patterns even without any external input. During this training period, STDP is carried out according to the procedure defined by Izhikevich, in "Polychronization: Computation with. Spikes," Neural Computation (2006) 18:245-282.

The STDP process changes the synaptic weights of the excitatory connections among the neurons, which affects the network firing dynamics. In this first step of STDP training, no input spikes other than the random input described below are used. The procedure described by Izhikevich is used, with random spikes injected to the neurons in the first layer of the network. The decision of which neuron to inject with a spike is decided based on a random choosing of all the neurons. During each iteration of the simulation (representing 1 millisecond of real-time), one neuron out of 1000 neurons is randomly picked to receive a 20-mv spike input, which is enough for the recipient neuron to fire in the next couple of iterations. For smaller networks with 100 to 200 neurons, the interval of such random input can be proportionally scaled down so that one neuron receives one such random input in one second. This procedure is carried for 100 seconds (or 100000 iterations where each iteration represents 1 ms in real life) or until the histogram of excitatory synaptic weights exhibits a bimodal distribution in which there is a high concentration of synaptic weights at the maximum value of 10 my, and a smaller concentration of weights at the minimal value of 0, with the rest evenly distributed across the range (0, 10).

Following the pre-training step, Step Two is performed. In this second step, the input samples that are representative of the actual input are introduced to the neurons in the first layer of the network and allow the synaptic weights to refine in response to the input through STDP. The inputs are presented in an alternating fashion and large enough intervals (e.g., longer than the input pattern lasts to allow the network activity to settle before the next input). This step is crucial because it allows the synaptic weights to evolve between neurons that are stimulated because of the input (directly or indirectly). These weights are strengthened (potentiation) or weakened (depression) due to the input. Such change in the synaptic weights among the neurons allow PCGs to form in which a group of neurons will fire in a precisely time-locked fashion in response to the input. STDP is carried out until the weights have a bimodal distribution in which a large portion of the weights concentrated at the maximum as a result of Step One above migrate to the minimum, and the histogram of synaptic weights becomes stable. A non-limiting example of such a large portion of weights result in a bimodal distribution, where 72% of the weights are at 0 and ~28% are at 10. At this point, the network has remembered all the input patterns. This typically requires a number of iterations over all input patterns the network is to remember. After that, STDP can be stopped while input patterns are presented (such as during the recall and testing stages). The neurons belonging to groups of PCGs learned during training will fire in the same way consistently as they did in this naming stage.

For further illustration, FIG. 4A shows an illustration of the neurons that fired in the entire network. The x-axis denotes the time and y-axis represents the neuron numbers. The input is shown, with dots indicating either all the excitatory neurons that fired or all inhibitory neurons that fired. The stars represent the readout neurons.

Further, FIG. 4B illustrates the result of training Steps One and Two above.

The figures are the result of training the first layer neurons with a temporal "ramp" input consisting of 10 channels as shown in FIG. 4A. There are two kinds of ramp that the network is set to memorize. The first is a sequence of 10 input spikes across the channels that visually show a positively-sloped ramp where the input consists of 10 input neurons that are stimulated every millisecond for 10 ms in a prescribed order. The second class is a temporal ramp where the neurons are stimulated in the reverse order.

As an alternative to the process described above, noise can be added to the input patterns during STDP training. Noise can be added to training patterns to enhance the generalization capability of a classifier, as is well known in the machine learning community. In the current invention, noise can either be added to the spike trains (i.e., sequence of spikes) generated from the input data spike encoder as random shifts in firing time, or it can be added directly to the input signal in its original form (such as gray-scale values of image pixels). Noise will create random variations of the input patterns, which makes forming PCGs more difficult during the STDP training process. However, since there is an abundance of PCGs within a SNN, the surviving PCGs that emerge after training using noisy input patterns will be more robust, and more representative of the class of the input patterns, allowing for more robust memory recall.

(4.3.2) Training the Readout

In readout training, the readout neural network 304 (the 2nd layer) is trained to allow the readout neurons to fire according to the input pattern the memory device is exposed to, thereby performing the memory recall or input pattern classification function. Readout training is carried out by adapting the delays of the connections between the first layer neurons and the 2nd layer readout neurons while presenting input samples that the first layer has learned during STDP training.

The readout training occurs after STDP training, and is consider a supervised training process since the input pattern is known. The first layer neurons must have been trained using the two-step process described earlier with input patterns of 2 or more "classes", where each of the classes can have input patterns that are essentially the same but may vary due to certain imperfections such as noise or incomplete patterns. Nevertheless, all these variations are still considered to belong to the same class.

A goal of the readout training is to make the readout network fire in a way to indicate what class the input pattern belongs to. This is done by having the readout neuron assigned to represent the class of input patterns (call it, the "truth neuron") fire first after the input is presented, with the remaining readout neurons firing after the truth neuron. The time between the truth neuron fires and the first non-truth neuron fires is called the "margin". A larger the margin provides a greater confidence in what the readout is indicating about what the class the input belongs to.

The readout training occurs by performing the following acts:

1) Present an input pattern to the first layer of neurons through the spike encoder which converts the input pattern into multiple spike trains that act as input to the neurons in the network (which causes neuron firing).
2) Wait until the neuron firing in the network has subsided or stopped;
3) If at least two of the readout neurons fired during the active firing period, then:
   i. If the truth readout neuron representing the correct class fired after any of other readout neurons representing the incorrect classes OR if it fired early but by less than a required margin (e.g., 10 ms) before any of the other readout neurons representing the incorrect classes have fired, then:
      a) Identify ALL the triggering connections (i.e., the pre-synaptic neurons to the readout neuron that is meant to represent the correct class);
      b) Decrease the delays of these triggering connections by 'x' ms (e.g., x=3 ms);
      c) Identify ALL the triggering connections to the non-truth readout neuron that fired first;
      d) Increase the delay of these triggering connections by 'x' ms (e.g., x=3 ms).
4) Repeat steps (1) through (3) with input patterns that belong to different classes until steps (3a) through (3c) are no longer executed for all classes or until a fixed number of iterations has been completed.

Figure 5A:
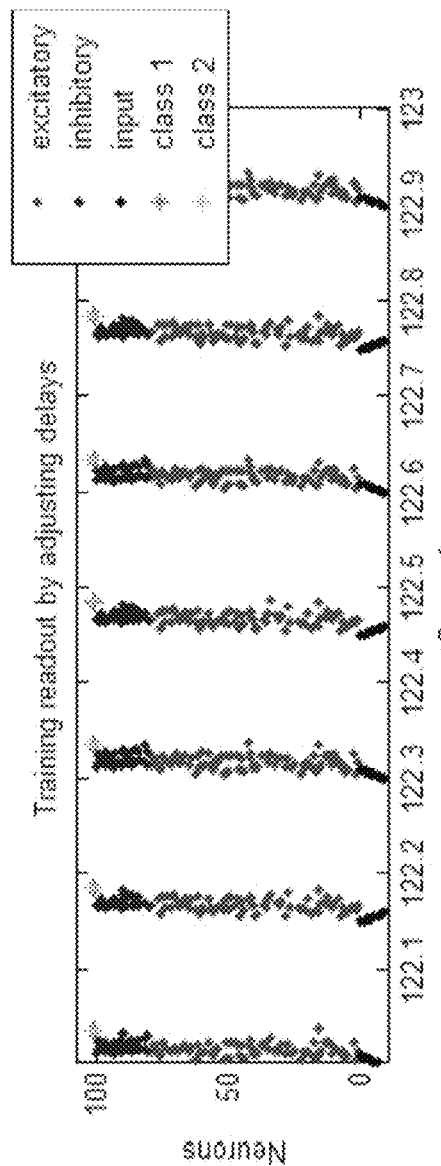
FIG. 5A is a graph illustrating a state of the network when readout training has just begun, and both readout neurons are firing at the same time.
Figure 5B:
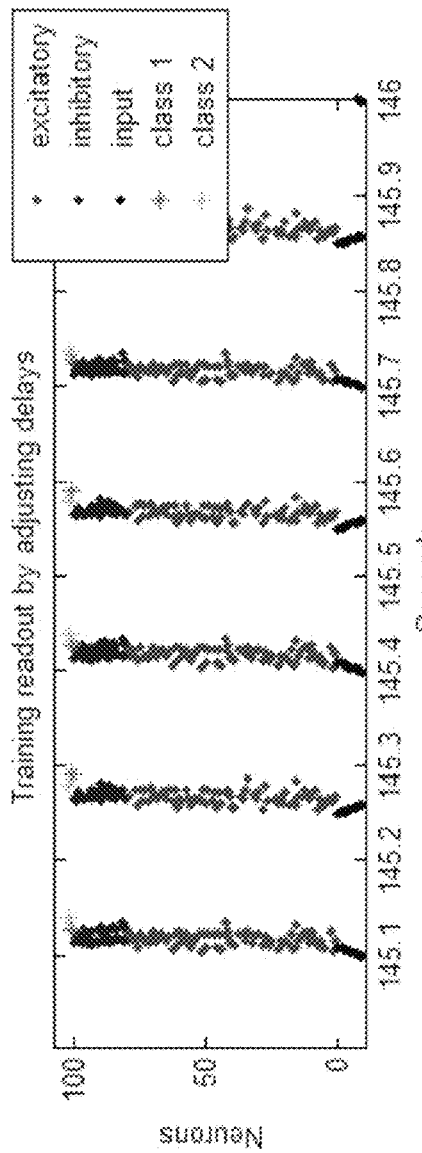
FIG. 5B is a graph illustrating readout neurons that have separated to reveal a type of input.

As an improvement over the prior art, the training process of the present invention decrements/increments the delays of all of the triggering connections to allow for convergence in only a few iterations. This basic training procedure can be universally applied to any number of classes. As a non-limiting example, the progression of training the readout on 2-classes with the ramp input is shown in FIGS. 5A and 5B. FIG. 5A is a graph illustrating a state of the network when the readout training has just begun, and both readout neurons (at the top of FIG. 5A) are firing at the same time. As shown in FIG. 5B, about 20 seconds later the readout neurons have separated to reveal the type of input. Positively-sloped ramp is 'class 1' and negatively-sloped ramp is 'class 2'.

In the description above, it should be noted that for convenience purposes, one output neuron was used for each class of input patterns. However, the present invention is not limited thereto as it can be applied using groups of output neurons in the output layer for each intended input class. Each of the added output neurons will have their own (full) connection from the first layer neurons in the network, but will have a different set of initial (random) delays from other output neurons for the same class. The readout training procedure will simply be modified to iterate over all such added output neurons for the same class (i.e., Act Three). The multiple output neurons per class allows for sampling the PCG activities more fully and more robustly, ensuring higher performance recalls compared with using only a single output neuron per class. Because this example uses more than one truth neuron for any single class during testing and recall, the decision rule needs to be changed for declaring the class of an input pattern. One non-limiting example is to use majority voting.

(4.3.3) Testing

Figure 6:
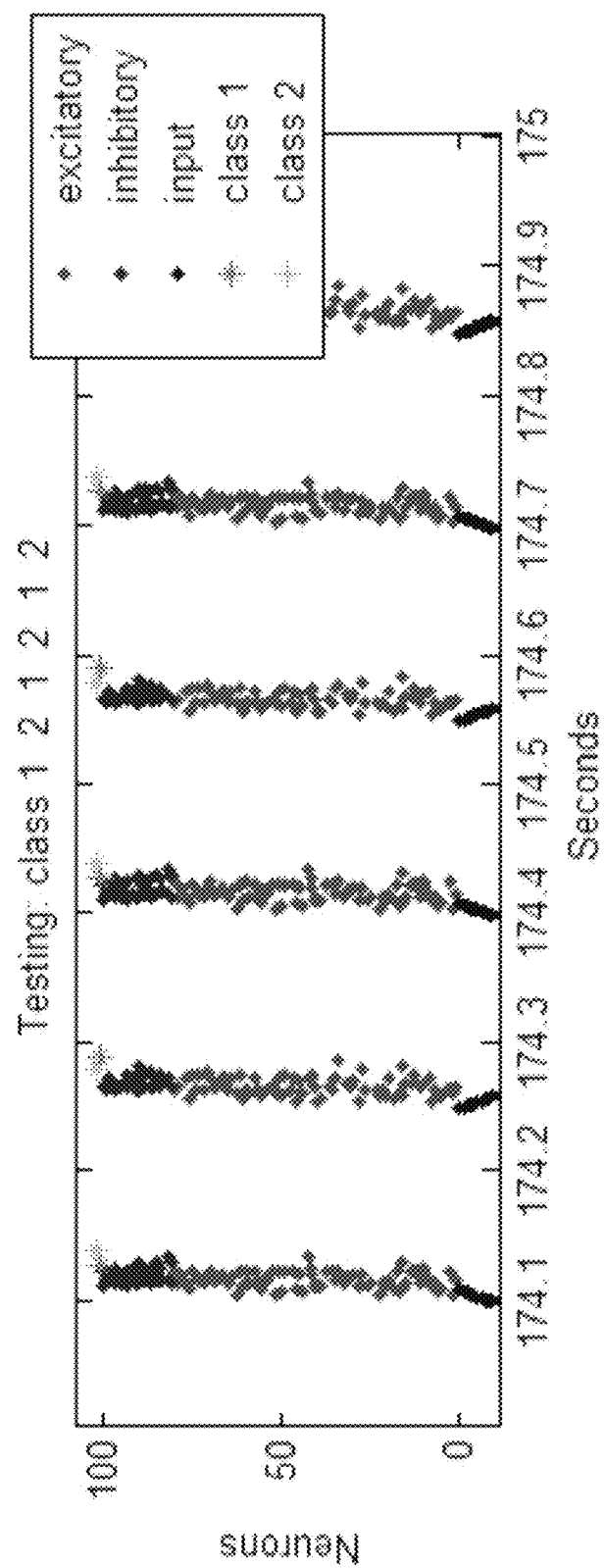
FIG. 6 is a graph depicting results of testing using a ramp input.

During testing, the adaptations of delays are stopped in a similar manner to that as described above with respect to readout training. The input is presented to the network in the same manner as in training and the firing activity of the network neuron in the first layer is recorded. For example, FIG. 6 is a graph depicting results of testing using the ramp input.

Figure 7:
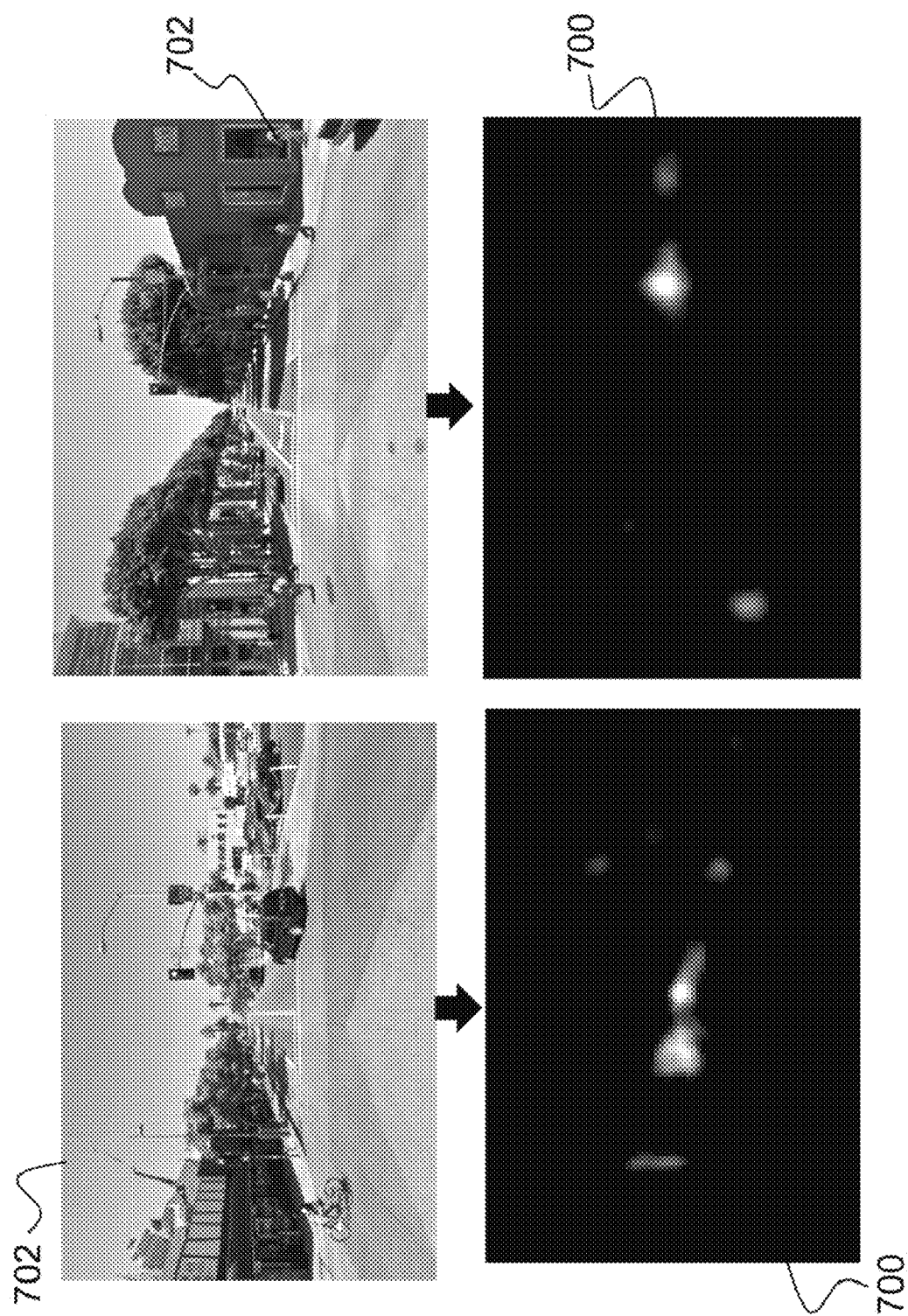
FIG. 7 are illustrations depicting salient regions extracted from two examples of street view images.

The readout mechanism is also used to classify images. To spike encode the input, "salient" regions are extracted using any suitable technique, a non-limiting example, EZVision as described by Professor Laurent Itti of the University of Southern California and posted at hap://ilab.usc.edu/toolkit/screenshots.shtml (taken on Jun. 1, 2011). FIG. 7 shows an example of salient regions 700 extracted from two examples of street view images 702.

Figure 8:
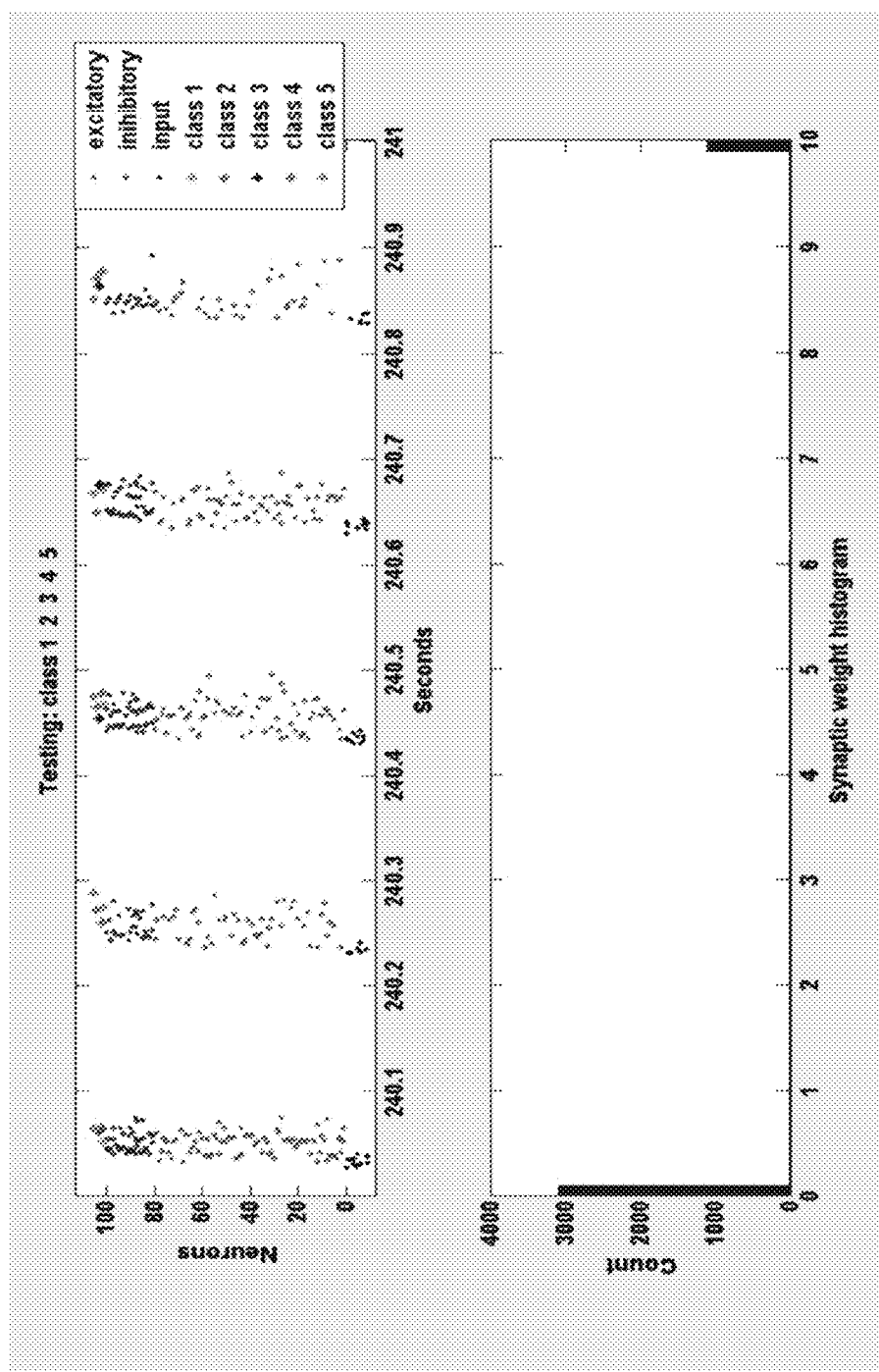
FIG. 8 is a graph depicting test results of the recall system with 5 classes of image data.
Figure 9:
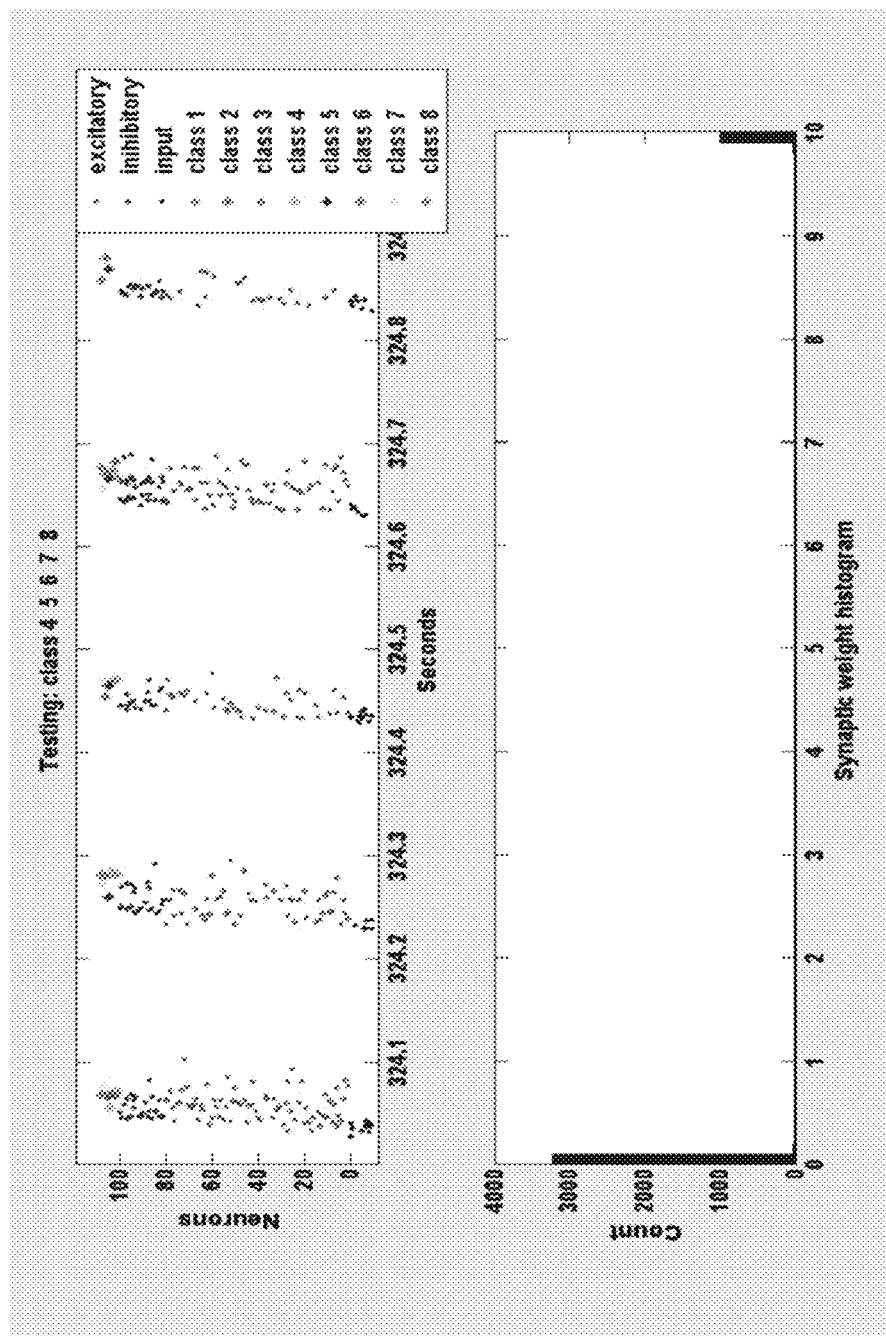
FIG. 9 is a graph depicting test results of the recall system with 8 classes of image data.

Next, the resulting images from the saliency module are quantized into 16 levels of intensity. Pixels whose intensity is within the 16 intervals are temporally fed into the network. The training and test procedures as described earlier are applied. The test results of 5 and 8 classes of image data are shown FIGS. 8 and 9, respectively. Both scenarios had 100% recall accuracy.

(5) Hierarchical Polychromous Spiking Memory

As noted above, the spiking neuron network (depicted as element 302 in FIG. 3) can be employed using hierarchical polychromous spiking memory. Alternatively, hierarchical polychromous spiking memory can be used for a variety of applications, such as speech recognition. Details of the hierarchical polychromous spiking memory are provided below.

The multi-layer hierarchical memory for spatio-temporal pattern recognition and recall is referred herein as the Hierarchical Polychronous Spiking Memory (HPSM). The HPSM performs higher-order feature learning while also providing memory capacity for different signal characteristics over multiple time scales. Established theory has shown how recurrent spiking neural networks can be used to uncover temporal features of input signals as a result of their delayed recurrent interconnections. HSPM expands upon this by exploiting the recent theory of polychronous groups, which describes how such spiking neural networks can perform unsupervised learning that enables them to theoretically exhibit a capacity for N! sequence-based memories where N is the size of the network. These networks can then be structured into hierarchical layers to learn higher-order features that span multiple time scales while integrating both spectral and temporal properties of the signal.

While the invention is applicable to any spatio-temporal input signal, the invention is described in terms of a speaker recognition paradigm that offers robustness to extrinsic and intrinsic variability factors that affect speech processing. In this context, a fundamentally new architecture is described that combines advances in understanding how the cochlea discriminates patterns, with advances in signal processing and memory based on new neural models. In addition, a companion methodology is described for analysis, tightly coupled to the architecture, which will discover unanticipated high-level features.

Figure 10:
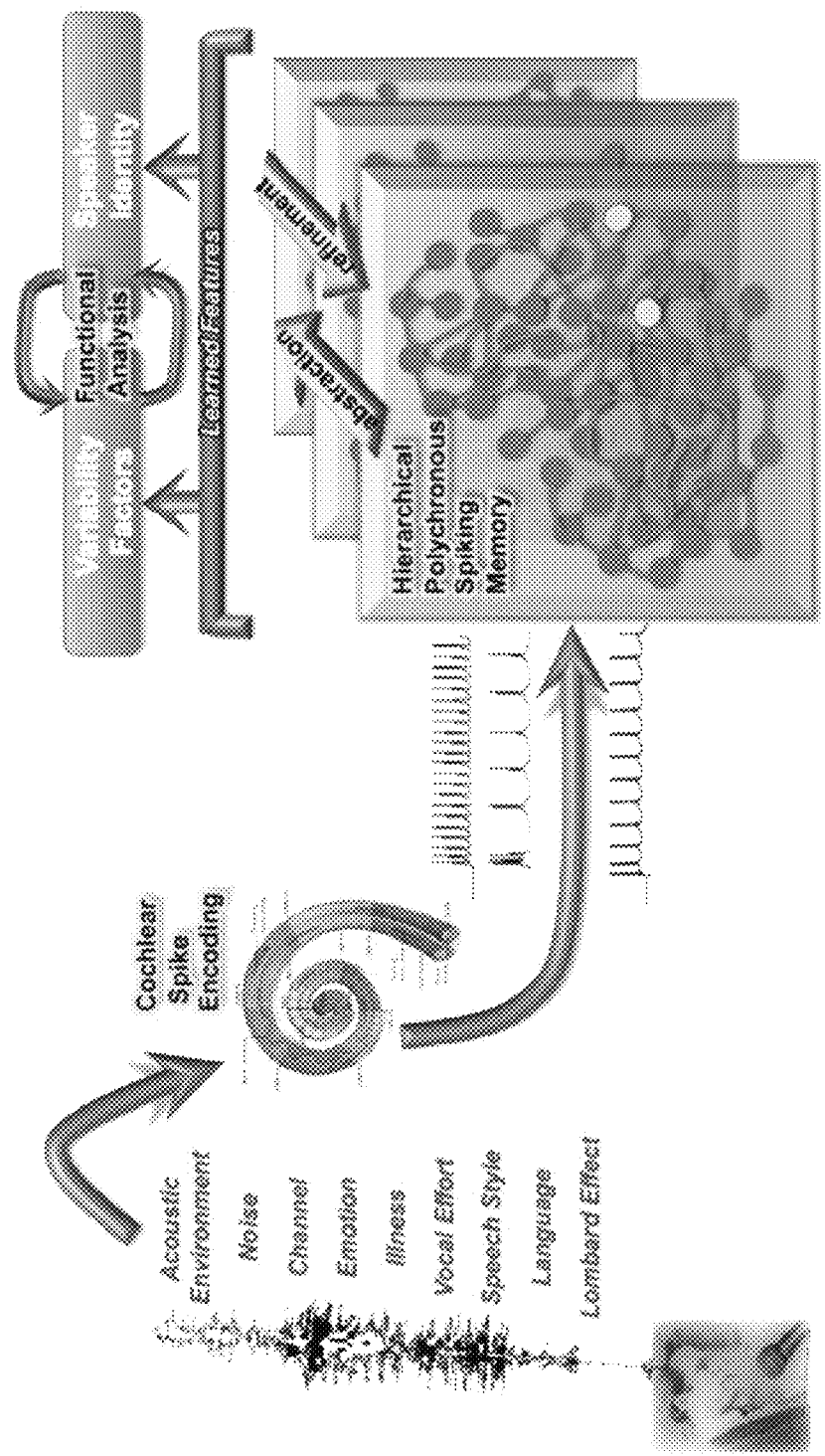
FIG. 10 is a flow chart depicting a relatively compact neural architecture according to the present invention that exhibits a memory capacity capable of retaining complex attributes of a human voice, as well as for providing rapid associative retrieval from a base of thousands of potential match candidates.

HSPM provides unsupervised learning of non-task specific features represented by spatiotemporal neural firing patterns called polychronous groups (PCG) for spatio-temporal signal processing. In the example of speaker-recognition, the spectral-temporal characteristics of a speaker's voice over multiple time scales can be used. As shown in FIG. 10, this is done within a relatively compact neural architecture that exhibits a memory capacity capable of retaining complex attributes of a human voice, as well as for providing rapid associative retrieval from a base of thousands of potential match candidates. The invention robustly recognizes speakers under a variety of adverse conditions using a combination of phase preserving spike encoding of speech inputs and a hierarchical neural learning approach for high-order features.

A pilot study has shown conclusively that a single layer of this architecture is able to discover unique features that discriminate between individual speakers, and also unique factors that discriminate between words. HSPM adds other layers to deal with variability factors. Input speech is encoded with a cochlear model that produces a set of input spikes that are phase-synchronized with the input signal. This temporal processing approach is distinct from conventional spectral methods that invariably must obscure detailed phase information because they process a waveform within a sliding window of time.

Automatic speaker recognition has been an important biometric research area since the 1970s, historically shaped and dominated by telephone applications, both commercial (e.g., speaking a password to gain bank access) and governmental. Performance accuracy has improved over time and speaker recognition rates as high as 97% (i.e., 3% equal error rate—EER) have been achieved in recent speaker recognition evaluations This includes tests using either cell-phone or landline phones, as well as cross-channel experiments (e.g., training on a cell-phone, testing on a landline). Bilingual and many other speaker recognition experiments have also been run with improving results.

In a 2008 National Institute of Standards and Technology (NIST) Speaker Recognition Evaluation (SRE), a new and different application area—the interview scenario was explored. In this case, an interviewer and a subject were seated across a table and had a conversation for 10-20 minutes. The speech was recorded with microphones at a 16 Kilohertz (KHz) rate. The interview scenario represents a different set of both challenges and opportunities from telephony: 1) the voice-on-voice problem is more prevalent and difficult in face-to-face interviews, 2) the range of vocal variations is greater in these interviews, 3) microphone placement issues become critical, and 4) much more speech is available for training and testing.

Based on the above, there are three major categories of problematic variability that are addressed by the present invention.

1) Intrinsic Variations: Intrinsic variations include internal speaker variability issues such as speech style (oration, read or conversational) and vocal effort (the continuum between whispering and shouting). Aging of the vocal tract is also considered an intrinsic variation.
2) Extrinsic Variations: Extrinsic variations include cross-domain recognition; for example, where one speech sample comes from the interview room and the other may come from a telephone. Additional extrinsic factors are room acoustic variations and noise.
3) Cross-language Variations: The difficulty of speaker recognition on cross-lingual speakers is not well-understood, but it appears to depend on the experience level with the non-native language. Therefore, determining which high-order features provide robustness to cross-language speaker recognition is a crucial concern.

The present invention improves the utility and performance of automatic speaker recognition systems through the exploitation of language independent higher-order features (i.e., phonetic cues, prosody, etc.). By using a biologically based time-domain input processing method, low-level temporal correlations are captured from a speaker's voice that are lost in conventional spectral analysis approaches. The core dynamic associative memory structure learns complex high-level features without supervision, which avoids the need to explicitly model each hand-picked speaker characteristic (often an error-prone process). Together, these methods provide an ideal complementary approach that can capture the characteristic signature of a speaker's voice across the entire range of relevant time scales, enabling robust recognition under many adverse situations. These advances have the potential for dramatically improving baseline capabilities. In addition, the architecture is compatible with future low-power analog neuromorphic hardware.

Figure 11:
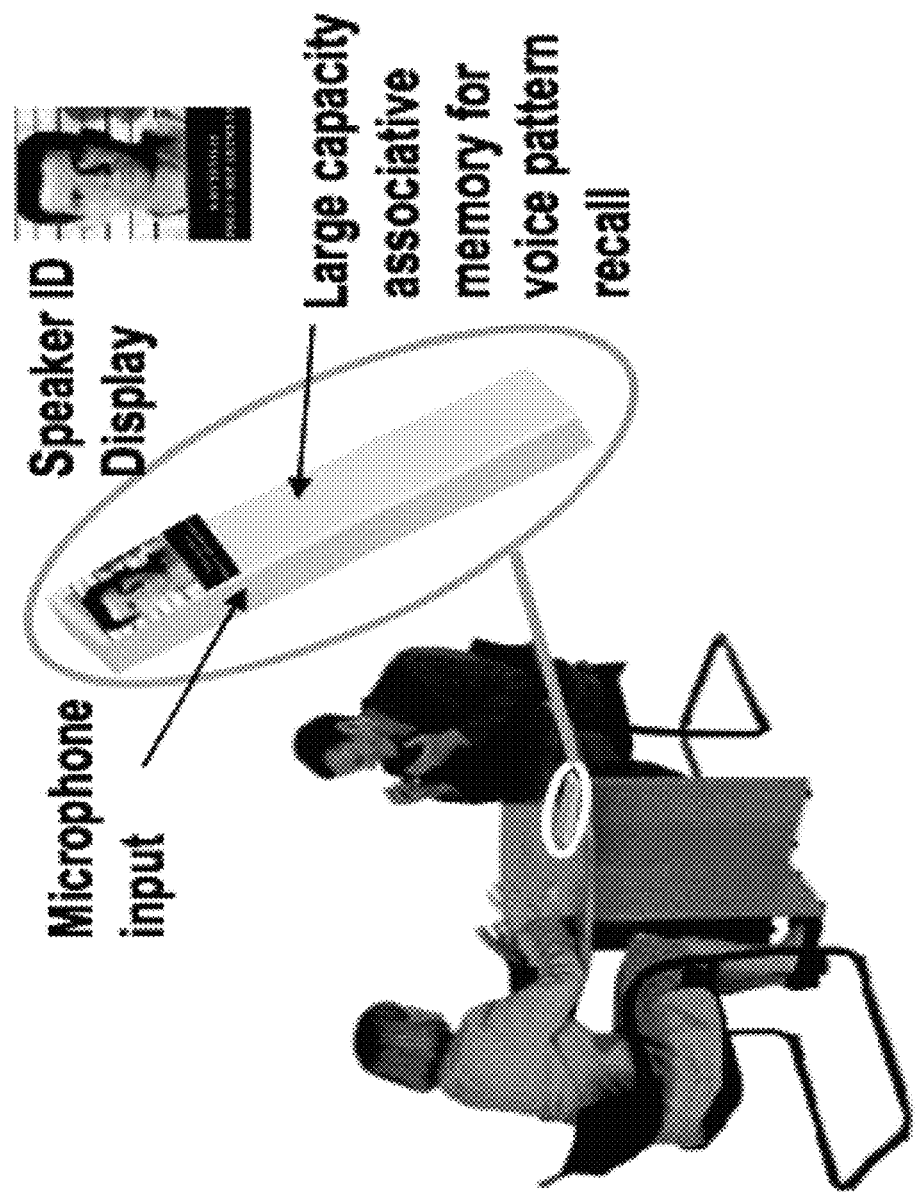
FIG. 11 illustrates one aspect in which the system is deployed in a compact form factor that could verify the identity of an individual based on voice recognition.

Although the system is useful for any product that recognizes temporal signals, it has been investigated and is described herein as being applicable for speech recognition and speaker identification. For example, FIG. 11 illustrates one aspect in which the system is deployed in a compact form factor that could verify the identity of an individual. Such a system could be built into a car, a building, an airplane or a computer as a security screening device.

Figure 12:
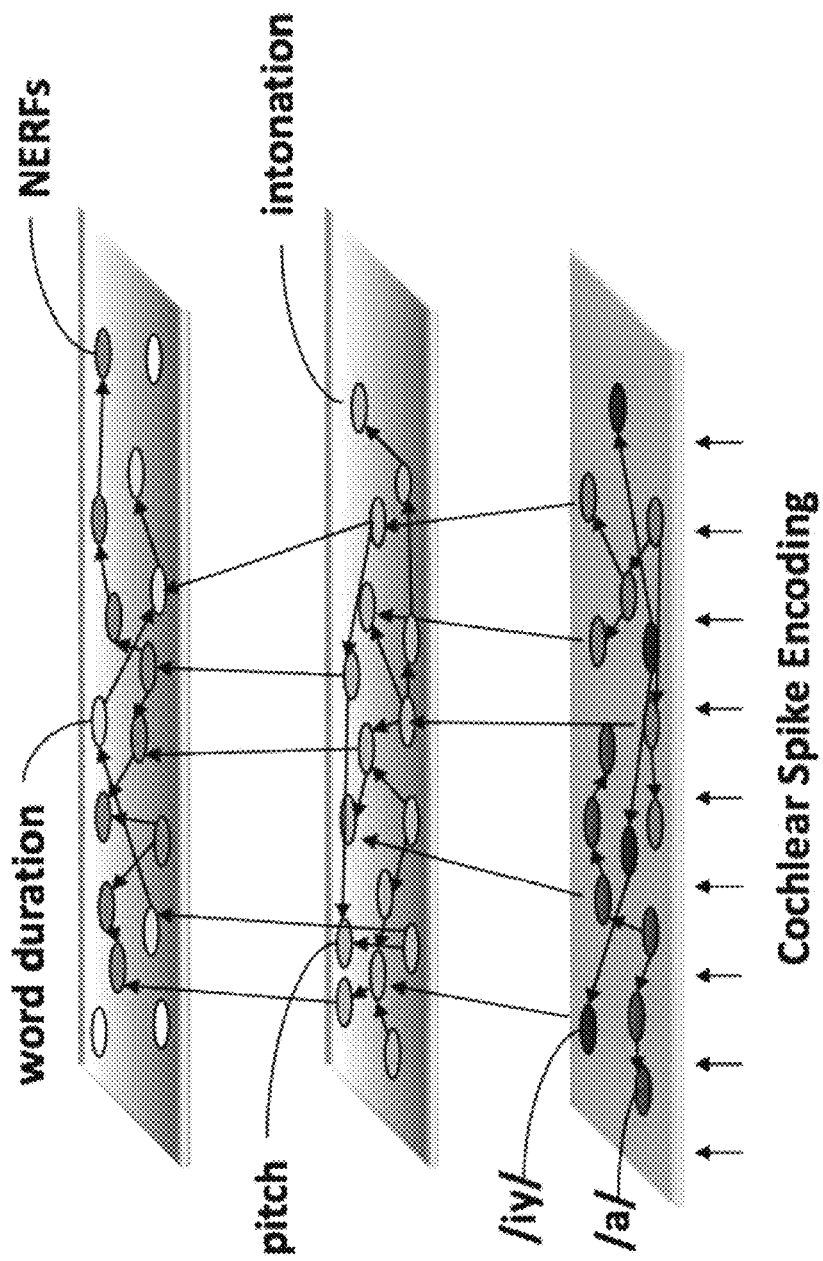
FIG. 12 is an illustration depicting how learning creates neural groups within each layer representing progressively higher-order features that cover longer temporal and wider spectrum intervals.
Figure 13:
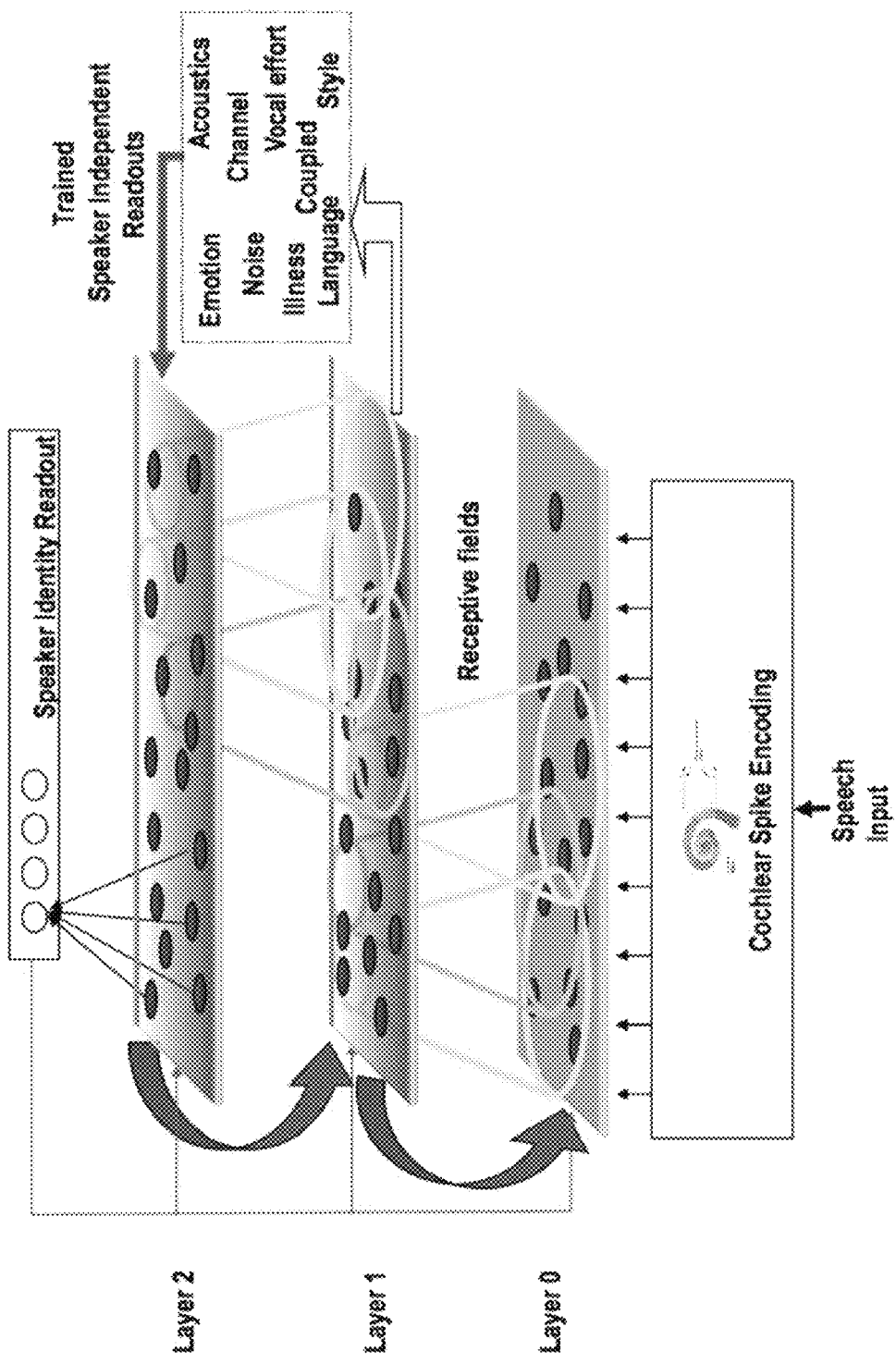
FIG. 13 is an illustration depicting cochlear spike encoding into a hierarchical polychronous spiking memory (HPSM) that exploits the adaptive dynamics of recurrent spiking neural networks with synaptic delays to resolve speech features within the time domain.
Figure 15:
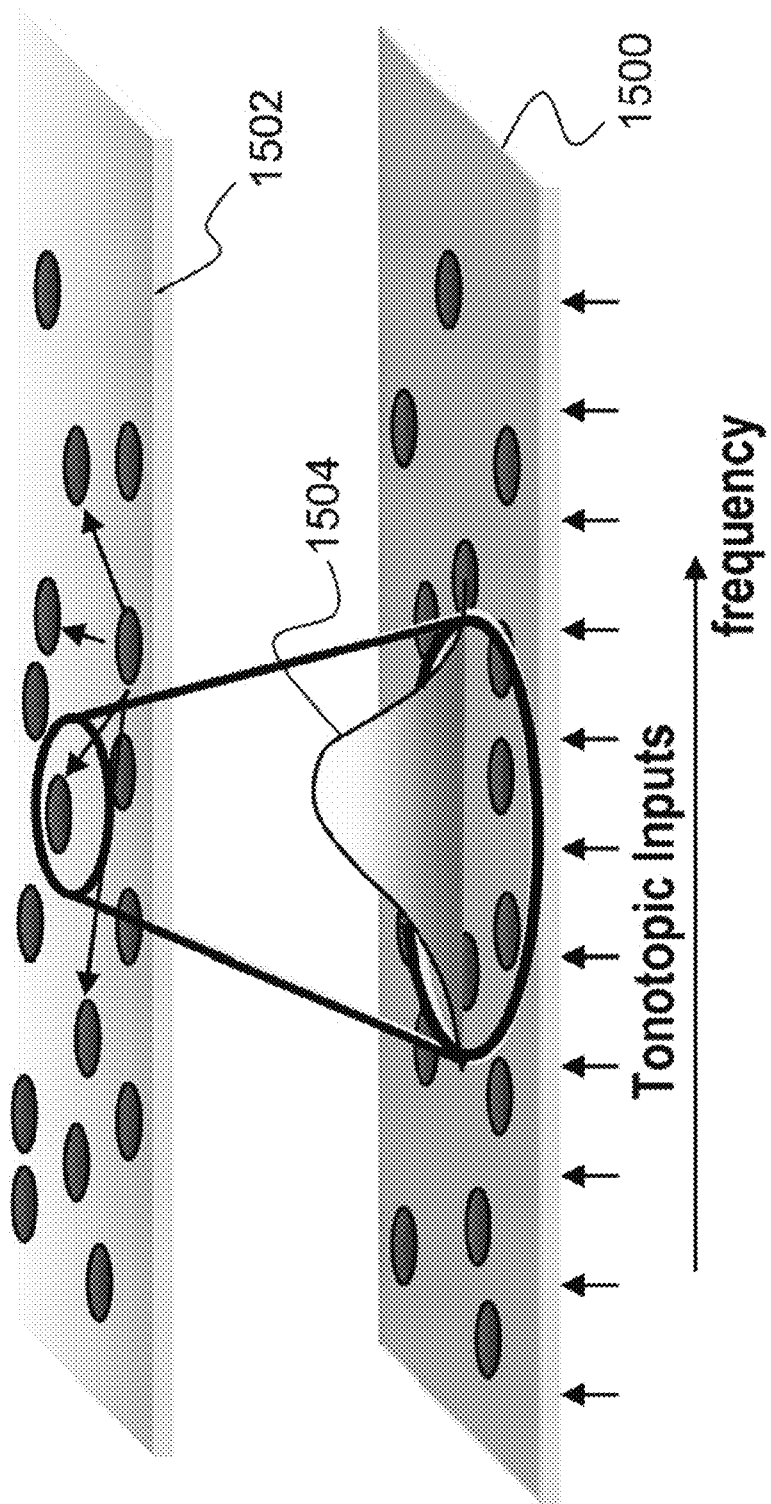
FIG. 15 is an illustration depicting how HPSM learns speech features at a first layer that trigger polychronous groups (PCGs) in the next layer through funnel shaped, localized receptive fields.

To confirm operability of the system, described below is a system demonstrating evident that the present invention does capture features intrinsic to the data. These features are useful for higher level processing. While a great deal can be done with a single layer spiking neural network, the system links multiple layers in a hierarchical connection pattern that mimics the overlapping upward projecting receptive fields and top-down feedback pathways found in the brain, as depicted in FIGS. 12, 13, and 15. This purposeful organization of connections facilitates the resolution of progressively higher-order features in each successive layer of the architecture.

The HPSM will perform two functions: 1) detecting performance-degrading variability factors in a speech signal; and 2) performing speaker recognition under variable degradation conditions. Functional analysis and performance characterization will play a vital role for both these purposes by helping to discover higher-order features expressed as repeatable spike pattern sequences within the HPSM. These patterns will feed back into the HPSM so the detected variability factors aid in speaker recognition. Combined in this way, these two functions provide a robust speaker recognition system despite unknown variability factors. Conventional approaches have proven inadequate for dealing with variability (5.1) Front-end Feature Extraction A detailed cochlear model, commonly known as Meddis hair-cell model, is used to turn recorded speech into spike trains mimicking the signals in the auditory nerve. The Meddis hair-cell model was described by R. Meddis in "Simulation of mechanical to neural transduction in the auditory receptor," J. Acoust. Soc. Am., vol. 79, pp. 702-711 (1986), and C. J. Sumner and E. A. Lopez-Poveda, "A revised model of the inner hair cell and auditory-nerve complex," J. Acoust. Soc. Am., vol. 111, no. 5, pp. 2178-2188 (2002), and C. J. Sumner, E. A. Lopez-Poveda, L. P. O'Mard, and R. Meddis, "Adaptation in a revised inner-hair cell model," J. Acoust. Soc. Am., vol. 113, no. 2, pp. 893-901 (2003), all of which are incorporated herein by reference.

The cochlear and hair-cell model provides the equivalent of a set of band pass filters, each tuned to a different frequency band. Groups of neurons within each frequency band are then triggered to fire in synchrony with the peaks of the filtered time-domain waveform. By further combining the spike patterns within such a group based on their degree of synchrony (DoS) to one another, a final input spike is train is obtained for each frequency band that is itself highly synchronized to the speech waveform. A unique aspect of spike trains generated from this approach is that the resulting spike timings from different frequency bands will maintain the phase relationships found in the original signal. The Meddis hair-cell model has been shown to produce the same responses as measured in animals in a number of brain areas considered important to speech processing.

A commonly ignored fact about the cochlea is that the firing rate along the auditory nerve is mostly saturated during normal conversational speech levels. This means that the firing rate is a poor cue for pitch or formant information extraction. Temporal phase locking between spike trains in the auditory nerve is a very noise-robust feature at normal conversational speech levels. However, at lower sound levels (mostly non-speech) the firing rate information can be used effectively while temporal cues are less compelling, resulting in a duplex theory for high and low level sound intensities. It has been shown that phase locking can be exploited to obtain improved phoneme recognition in comparison to standard Mel Frequency Cepstral Coefficients (MFCC), particularly in low SNR environments. This is not surprising considering that the quantitative information regarding the pitch and formants is only present in the time domain.

Figure 14:
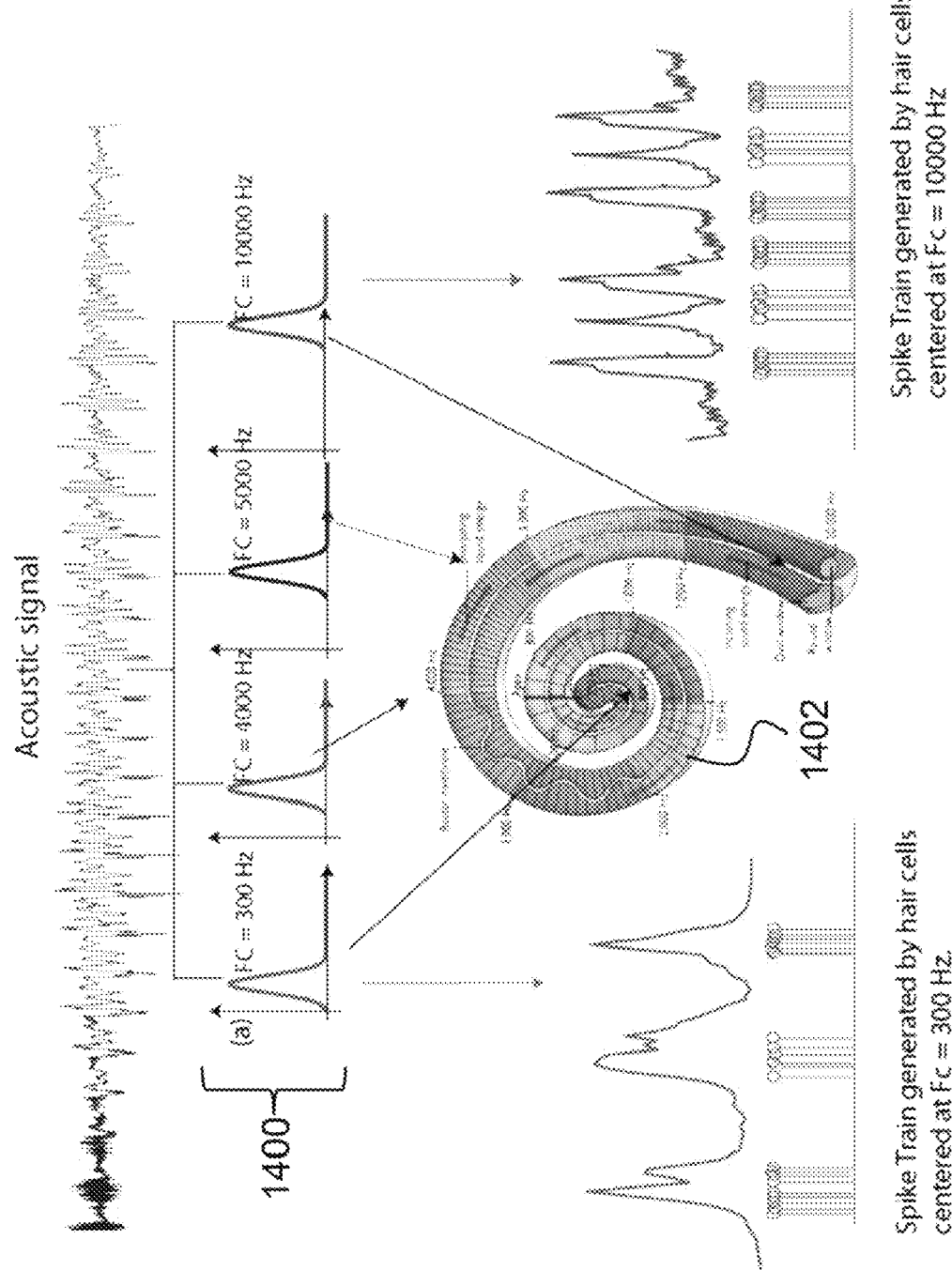
FIG. 14 is an illustration depicting how an input audio signal is encoded using a cochlear model with a phase-preserving spike encoding mechanism to transform input audio signals into spike trains that preserve both spectral and temporal domain speech features.

FIG. 14 illustrates the spike input scheme with a tonotopic structure consistent with the findings in neuroscience that different frequency channels 1400 map to different areas of the auditory cortex 1402. Spike input from channels of nearby frequencies are mapped to the HPSM input layer with proximity structure so that nodes in the HPSM input layer close to an input point have higher probability of connection than those that are far away, and the receiving nodes to nearby channels are also overlapping to promote discovery of spectral-temporal features across multiple input channels.

(5.3) Hierarchical Polychronous Spiking Memory (HPSM)

To extract features from the spike train input for speaker recognition, the recall system includes a hierarchical structure that can automatically learn low-level features such as pitch, volume and tonal transitions as well as higher-order features such as speaker style and prosody. Furthermore, the feature learning process is completely unsupervised, and only the final classification of speaker identity using the learned features requires labeled data. This feature learning architecture is called the hierarchical polychronous spiking memory (HPSM). Within the HPSM structure, low-level features form in the input layer, and higher-order features form in higher layers through the synaptic connections between the layers. Higher layers effectively memorize and generalize the output of lower layers.

A single layer within the HPSM is a network of spiking neurons with random or structured synaptic connections and fixed axonal conduction delays. While the use of spiking neural networks for general purpose representation and classification is well developed and recognized, the concept of "polychronization" is a more recent discovery in computational neuroscience, which can explain many of the phenomena observed by neural scientists (such as spike-timing synchrony and gamma rhythms). Polychronization is a phenomenon in spiking neural networks in which groups of neurons exhibit reproducible time-locked firing patterns; hence they are called polychronous groups or PCGs. The PCGs are triggered by the location and timing of the input spikes, and are sharpened by a process known as spike-timing-dependent plasticity (STDP, also known as Hebbian rule) in neuroscience. Once learned, PCGs can be recalled (or activated) when a new stimulus signal is presented to the network. Even though the theory of polychronization is very new, it has been independently verified and used to build Liquid State Machine-like spiking neural networks to classify hand-written digits with a special read-out network, as described by H. Paugam-Moisy, R. Martinez, and S. Bengio, in "Delay learning and Polychronization for Reservoir Computing," Neurocomputing (2008), 71, 1143-1158, which is incorporated by reference as though fully set forth herein.

The HPSM acts like a huge memory that can store combinations of spectral-temporal features from the input. PCGs are used as basic building blocks to represent and store features of speech in a single HPSM layer, and to capture both short-duration (40-150 ms) and long-duration (several seconds or longer) spectral-temporal features. PCGs are activated depending on the number and timing of current input spike trains. More importantly, because of the recurrent nature of the HPSM layer, PCG activation also depends on the present and past history of input spikes. Furthermore, chains of PCG activation patterns can represent "meta" features at even longer time horizons. This concept of "meta" features was described by H. Paugam-Moisy, R. Martinez, and S. Bengio in "Delay learning and polychronization for reservoir computing," Neurocomputing (2008), 71, 1143-1158, which is incorporated by reference as though fully set forth herein.

PCGs are also redundant and overlap, making them robust for speech representations and capable of generalization from partial patterns. During recall, only a small percentage of the learned PCGs will be active each time depending on the relative timing of input spikes. Yet, the subset of activated PCGs still captures the characteristics of the input. Unlike the spiking neural networks in LSMs, the neurons in the HPSM have random (but fixed) synaptic conduction delays. This creates a dynamical (recurrent) system with very high dimension, and can theoretically contain up to N! PCGs in a network of size N neurons. This huge representation space can store millions of speech patterns and still provide instantaneous recall like human associative memory with the capability for matching partial patterns.

(5.4) The Hierarchical Nature of HPSM

By arranging multiple spiking neural networks in a layered structure, the HPSM is structured to learn higher-order abstract speech features from unlabeled samples automatically. Research in neuroscience has long recognized the importance of hierarchical processing in the cortex for a variety of tasks, e.g., vision. In particular, hierarchical structures with localized receptive fields that learn important visual features have been found by researchers to be especially important to visual recognition tasks. A similar hierarchical structure was found to exist in the auditory cortex. More recently, layered connection patterns in the brain have been found to significantly improve performance in classification tasks using spiking neural networks compared with random unstructured connections. Structured connections in recurrent dynamical systems are also able to represent patterns at different time-scales.

Figure 16:
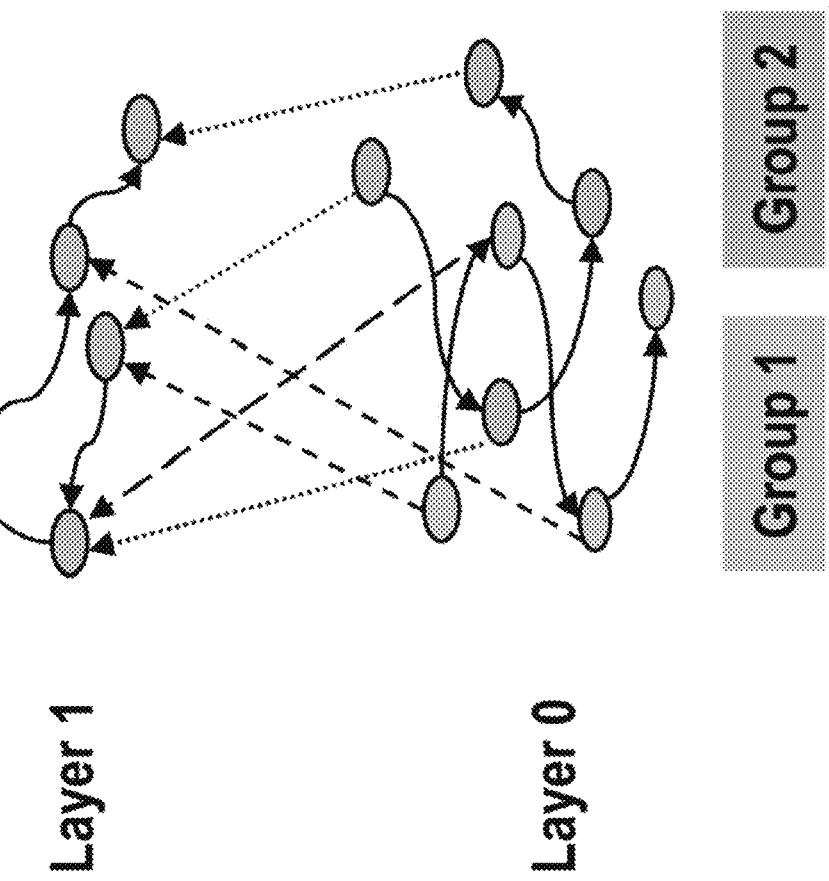
FIG. 16 is an illustration depicting how lower-level features (e.g., Groups 1 and 2) activate higher-order features depending on the connection strength and timing of activation of the neurons involved.

For example, FIG. 15 illustrates a sparse and localized receptive field that connects the lower layer 1500 activations to the next upper layer 1502. HPSM learns speech features at the first, lower layer 1500 that trigger PCGs in the next, upper layer 1502 through funnel shaped 1504, localized receptive fields. PCGs formed in higher layers extend further in both time and frequency to encourage information aggregation and abstraction. Each higher layer memorizes the relevant active PCGs from a lower layer. This design allows the upper layers in HPSM to form PCGs through the localized sampling of lower layer PCGs, and provide abstraction of the features in the lower layer in two ways. First, the shape of the receptive field allows the higher layer 1502 to have a wider spectral-temporal coverage than its immediate lower layer 1500. Second, the sparse sampling of the connection ensures the upper layer's 1502 activation corresponds to common recurring patterns in the spectral-temporal domain in the lower layer 1500. Furthermore, downward feedback connections help promote the feature selection process in lower layers 1500. This approach enables discovery of progressively higher-order and invariant features at higher layers in the hierarchy. For example, FIG. 16 illustrates a specific example of how low-level features (i.e., Groups 1 and 2) can be combined to form higher-order features. In this example, the lower-level features (e.g., Groups 1 and 2) activate higher-order features depending on the connection strength and timing of activation of the neurons involved. For example, either Group 1 or Group 2 is required to activate features in Layer 1 or both Group 1 and 2 are required.

(5.5) Functional Analysis and Performance Characterization

Once the unsupervised feature learning process has been carried out, in order to perform speaker recognition, the set of characteristic PCGs and their complex firing patterns associated with a specific speaker must be identified. Each PCG is characterized by precise time-intervals between successive firings of specific sets of neurons. One method for reading out information from these patterns is to create a set of readout neurons with random connections into the HPSM and to adjust a set of link delays on these connections so that they converge, triggering a readout neuron to fire in correspondence with a desired output. This has been demonstrated with a read-out network that is fully connected to a spiking neural network, and with a read-out network for an LSM involving STDP training, by H. Paugam-Moisy, R. Martinez, and S. Bengio in "Delay learning and polychronization for reservoir computing," Neurocomputing (2008), 71, 1143-1158, and A Oliveri, R Rizzo, A Chella, in "An Application of Spike-Timing-Dependent Plasticity to Readout Circuit for Liquid State Machine," IJCNN 2007 at the International Joint Conference on Neural Networks, 12-17 Aug. 2007, pp. 1441-1445, respectively, both of which are incorporated by reference as though fully set forth herein.

A simpler alternative learning approach; used in the proof of concept test described below, is to explicitly analyze the delay pathways within the network itself to obtain a catalogue of PCGs, as described by Izhikevich, E., in "Polychronization: Computation with Spikes", Neural Computation (2006) 18:245-282. Specific firing patterns that are observed are then matched to the groups identified in the catalogue, with histograms and relative occurrences then analyzed to yield a better understanding of the inner relationships of PCGs in the HPSM. A technique for decoding and reading out the underlying memory structure can then be built.

While the automatically learned features contain enough information for speaker recognition, high-level guidance or reinforcement of speaker-independent variability factors will enable improved recognition performance by strengthening the connection weights between neurons in a PCG and across layers. These speaker-independent factors (nine extrinsic and intrinsic factors including emotion, noise, illness (nasal congestion), language, acoustics, channel, vocal effort, style, and coupled factors (e.g. Lombard effect)) are used as additional inputs to the HPSM hierarchy during a second training sequence for feature learning and during testing if available. If speaker-independent factors are not available, the HPSM learns them by training a set of readout units that take input from one or more of the layers. In the testing phase, these readout units provide persistent feedback into the network to inhibit responses from PCGs that are not appropriately related to the identified state, and to promote those that are.

(5.6) Test Results

A pilot study of the recall system using HSPM showed dramatic first-time results of simultaneous and distinct representations for characteristic speaker and word features within the same network. Thus, the approach can unify intrinsic and extrinsic factors with the detection of speaker-specific characteristics to achieve significantly more robust speaker recognition. The prototype of the system was designed using an Izhikevich network of 1000 neurons (800 excitatory, 100 inhibitory). The parameters of the network were exactly as detailed by Izhikevich (in his 2006 work) with the exception of a superimposed topological organization of the neurons, and a specialized tonotopic input layer. Random connections were assigned between neurons. The "Tonotopic Liquid State Machine (LSM)," illustrated in FIG. 17, organizes neurons in fixed locations in a grid on a number of discrete levels (10 are depicted in this example), and the neurons prefer local connections over distant ones. Connections for two randomly chosen neurons are shown to illustrate locality of connection. Dark blue neurons are inhibitory, light blue neurons are excitatory. 10% of the neurons were randomly allocated to each level. Each excitatory neuron was connected to 100 neurons with a preference for local connections using the locality definition by Raichelgauz, except that the denominator lambda was not squared, to prefer more local connections (See, Raichelgauz, I., Odinaev, K., & Zeevi, Y. Y. (2006). Natural signal classification by neural cliques and phase-locked attractors. Conference Proceedings of the International Conference of IEEE Engineering in Medicine and Biology Society, Suppl, 6693-6697, which is incorporated herein by reference). So the probability of connection here is $C^*\exp(-D(ij)/\text{lambda})$, where C=0.3 (EE), 0.2 (EI), 0.4 (IE), 0.1 (II). EI means a connection between an excitatory and an inhibitory neuron, and EE, IE, and II are similar (i.e. connection between excitatory and excitatory neuron, etc.). $D(i,j)$ is the distance between neuron i and neuron j, while exp is the exponential function.

Figure 17:
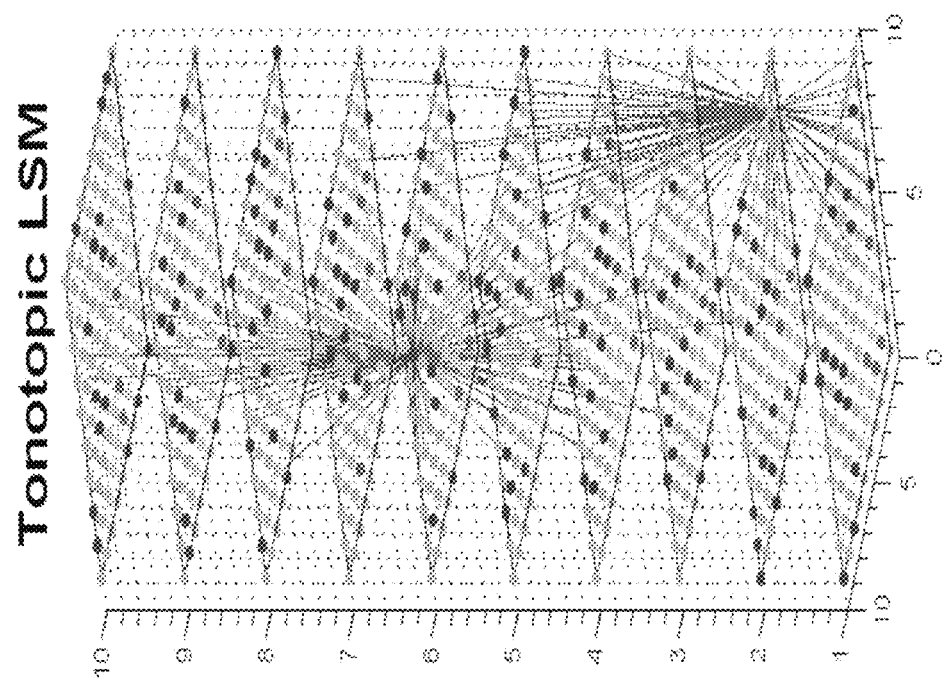
FIG. 17 is an illustration depicting organization of an Izhikevich network into a three-dimensional (3D) grid.
Figure 18:
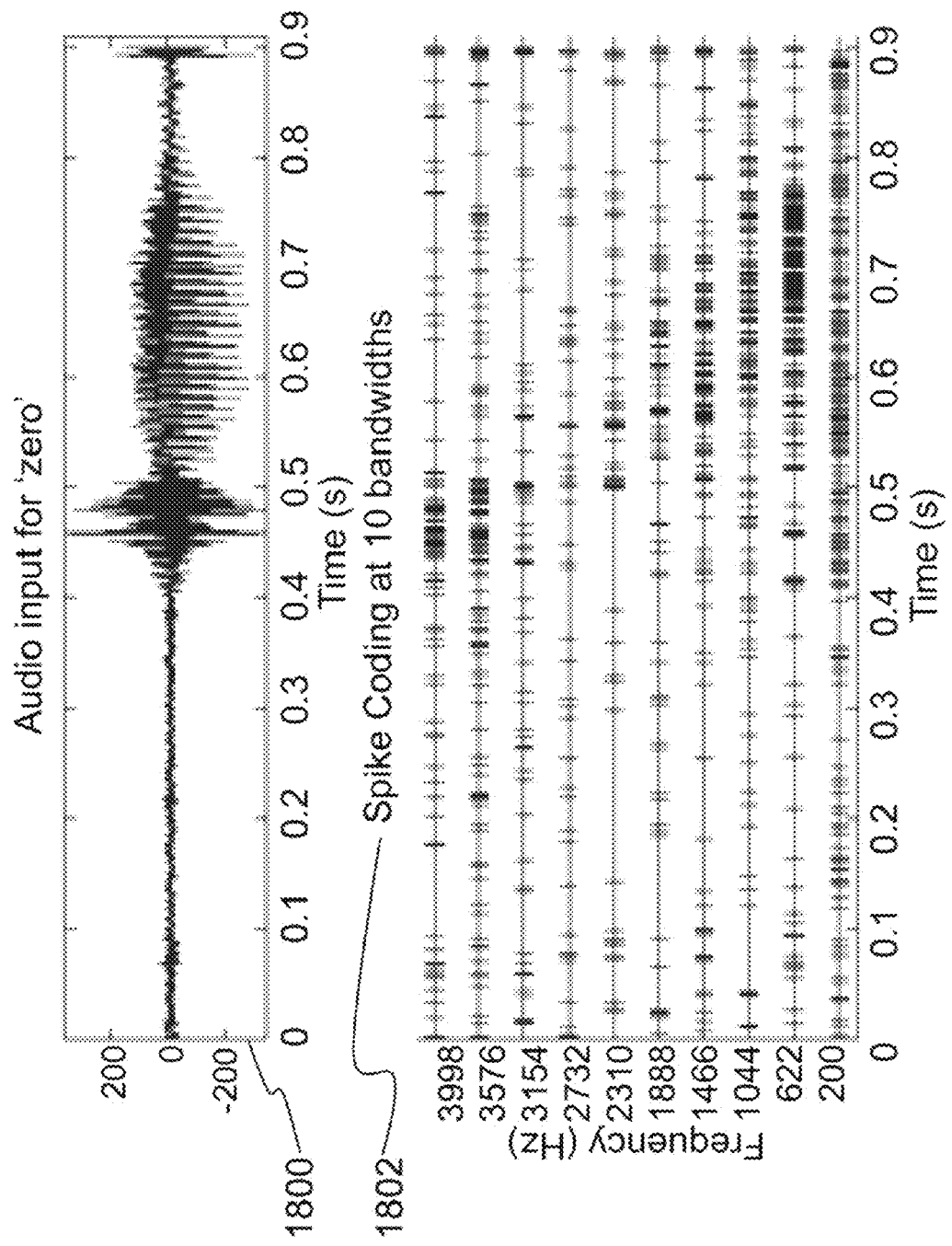
FIG. 18 is an illustration of depicting spike train encoding of an audio signal for the phrase "zero"

The Tonotopic LSM as shown in FIG. 17 has 200 input neurons, 20 per level in the grid. Each input neuron is connected to a randomly chosen neuron on the same level, ensuring a 1-to-1 unique mapping of the inputs onto the LSM. Audio is encoded into neural spike trains using a Lyon cochlear model with a Meddis hair cell simulation. Output from each of the 10 hair cells captures a different frequency of the audio and is connected to a different level of the grid, so spike trains for different audio frequencies are directed to neurons on different levels of the grid. As an example, FIG. 18 illustrates the audio for zero 1800, along with the 10 spike trains 1802 that were encoded from the model.

Data for the pilot study was captured by recording two speakers saying the digits 0-9, 10 times each. They were recorded at 44,600 Hz and stored in WAV format on disk. Each audio file was encoded into 10 frequency band spike trains with the Lyon/Meddis model. The network was initially trained by presenting the spike trains for the first five repetitions of each speaker saying digits 0-9. Each vocalization was presented in turn, with 1 second rest in between, and no resets, over and over, for a simulated 5 hour training period, during which STDP was used to "sharpen" the PCGs by driving the synaptic weights to a bimodal 0/1 distribution. After that, the Izhikevich method was used to find a list of all PCG's.

After the training period, the experiments were run. During the experiments, a "entire-hard-reset" was used instead of STDP. The "entire-hard-reset" was described by P. Knusel, R. Wyss, P. Konig, and P. Verschure, in "Decoding a Temporal Population Code," Neural Computation (2004) 16, 2079-2100, which is incorporated herein by reference. The "entire-hard-reset" means that the initial state is always made the same before any input; i.e., to reset all voltages and synaptic currents to a default value. Knusel tried a variety of resets, including just resetting neuron voltages (partial-hard), and setting either neurons only or neurons and synapses to random values to approximate the history of past inputs ("entire-random-" or "partial-random-reset"), vs. no reset, and got his best results with the entire-hard-reset. Resetting the network before inputs means there is no dynamic state beforehand, so only the inputs and the delays and learned weights of the connections are going to trigger a PCG. Note that both this test and Knusel used a locality of connections scheme, similar to that used by Maass, with a 12×12×5 grid of neurons (See Maass, Wolfgang; Natschlager, Thomas; and Markram, Henry (2002). "Real-time computing without stable states: a new framework for neural computation based on perturbations". Neural Computation 14 (11): 2531-60, which is incorporated herein by reference).

The experiment compared two different speakers saying the words "zero" and "three" several times: the $6^{th}$, $8^{th}$, and $10^{1h}$ repetition of the digits 0 and 3; i.e., these repetitions were not in the training set. The spiking activity in response to each stimulus was matched to the total list of PCG's to find a list of PCG's that fired in response to the stimulus. The matching itself is not exact in that all the neurons of a PCG will not fire. So it was required that at least 3 of the first 5 spikes in the PCG must match to say that a PCG fired. From this data, the statistics depicted in FIG. 19 were compiled. FIG. 19 depicts a table illustrating the number of PCG's active for each speaker, indicating good strong overlaps for things that are known to be in common but poor overlaps for things that are not in common; e.g., it shows that the overlap between the intersections of the speaker and the phrases is minimal. For example, if the 43 PCG's in the intersection of speaker1 (the characteristic PCG's of speaker1) are compared with the 60 PCG's that are characteristic of multiple speakers saying "zero", only 6 are common. There was only 1 PCG (PCG #2281) in common between the 43 PCG's of speaker1 and the 137 PCG's of speaker2. Likewise, there was only 1 PCG (also PCG #2281) in common between the 60 PCG's of "zero" and the 84 of "three". This suggests that PCG's are characteristic of a speaker, as well as of words.

Figure 20:
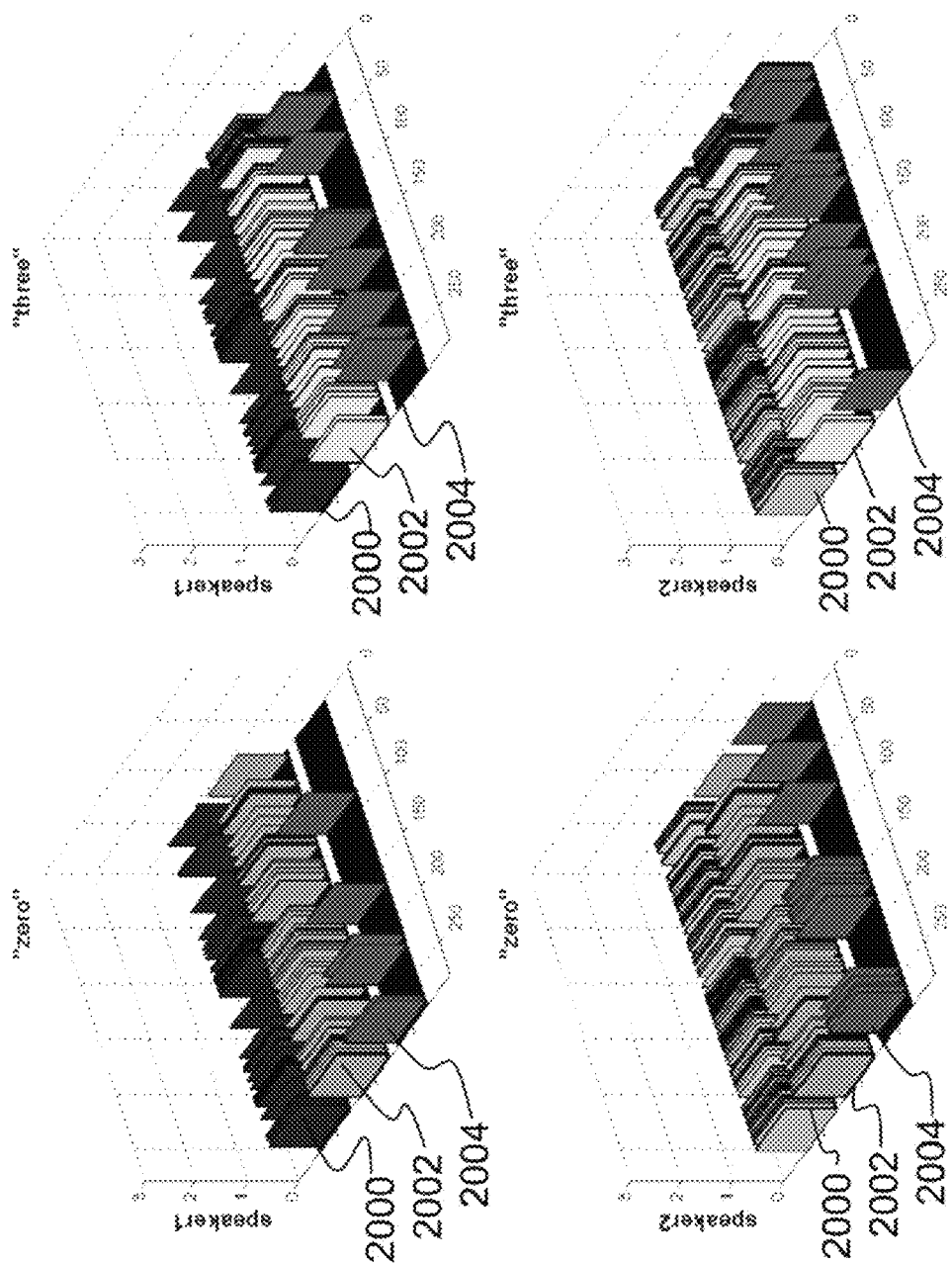
FIG. 20 includes four graphs plotting intersections between active PCGs from real voice samples, depicting the severability of distinct speakers and words.

FIG. 20 illustrates the analysis of FIG. 19. The four bar graphs plot the relevant sets of PCGs that were excited by the utterances in their titles, for the corresponding speaker that is printed near the Y axis of each graph. The back row 2000 of each graph represents the PCGs that were common for the same speaker saying different words, and are colored dark blue for speaker1 and light blue for speaker2. These are the identifying PCG sets unique to each given speaker. The middle row 2002 shows the PCGs that were common between different speakers saying the same word, and are green for "zero" and yellow for "three". These are the word-specific PCGs that are speaker independent. The front row 2004 of each (in red) is of greatest importance, because this represents the intersection between the middle 2002 and back 2000 rows. The sparsity of the red rows in each graph indicates the relative independence between detected speaker and word characteristics. The study provides evidence that the HPSM structure combined with the cochlear spike encoded input can capture a variety of speech features that are speaker-specific but word-independent for speaker recognition. Moreover, this verifies that the HPSM can simultaneously perform dual roles of discovering features related to intrinsic and extrinsic variable factors while also performing speaker recognition. This dual capacity will improve recognition performance and can be implemented in a variety of devices.

(6) Summary

Described is a recall system based on spiking neural network models that can be trained to remember real life input data. Detailed network structure, parameters and training procedures necessary for a working device are given. The device can be used as a recognition device to recall or recognize input patterns associated with those that the device was trained on. The system can be implemented in miniature and portable recognition devices for such applications as speech recognition, speaker identification and face recognition, just to name a few.

What is claimed is:

1. A recall system using spiking neuron networks to identify an unknown external stimulus, the recall system comprising one or more processors and a memory, the memory storing computer code which, when executed by the one or more processors, cause the one or more processors to perform operations of:
   receiving a first input signal originating from a known external stimulus, the first input signal having first spatial-temporal data;
   converting the spatial-temporal data into a first spike train;
   receiving the first spike train in a spiking neuron network, the spiking neuron network generating a first set of polychronous groups (PCGs) as a result of the first spike train;
   receiving a second input signal originating from an unknown external stimulus, the second input signal having second spatial-temporal data;
   converting the second spatial-temporal data into a second spike train;
   receiving the second spike train in the spiking neuron network, the spiking neuron network generating a second set of PCGs as a result of the second spike train;
   recognizing the second set of PCGs as being sufficiently similar to the first set of PCGs to identify the unknown external stimulus as the known external stimulus;
   wherein in converting the spatial-temporal data into a first spike train, the first input signal is converted into frequency-specific spike patterns that are then combined based on a degree of synchrony to generate the first spike train; and
   wherein in receiving the first spike train in the spiking neuron network, the spiking neuron network is a hierarchical network, with a first layer having neurons that are tonotopically organized, such that spike trains from individual frequency bands are routed to neurons in the first layer according to the frequency bands to generate an initial group of PCGs, with the initial group of PCGs becoming an input to an upper layer in the hierarchical network to generate the first set of PCGs.

2. The recall system as set forth in claim 1, wherein in converting the spatial temporal data into a first spike train, a spatial component is represented by multiple channels that can carry spikes to neurons in a first layer of the spiking neuron network and a temporal component is represented by a timing of the spikes coming out of each channel, such that the timing of the spikes, a number of the spikes, and a location of each channel together encode the input signal into the first spike train.

3. The recall system as set forth in claim 2, further comprising an act of training a first layer of the readout neural network by pre-training with a random thalamic input and training with the first input signal originating from the known external stimulus.

4. The recall system as set forth in claim 3, wherein pre-training allows synaptic weights to settle based on random network connections that are present and wherein training with the first input signal causes the synaptic weights to refine in response to the first input signal until the synaptic weights have a bimodal distribution in which weights concentrated at a maximum as a result of the pre-training migrate to a minimum, and where a histogram of synaptic weights becomes stable.

5. The recall system as set forth in claim 4, wherein the act of recognizing the second set of PCGs as being sufficiently similar to the first set of PCGs is performed by a readout neural network.

6. The recall system as set forth in claim 5, wherein the readout neural network is trained to allow readout neurons to fire according to an input pattern the recall system is exposed to, thereby performing a memory recall or input pattern classification function.

7. A computer program product for identifying an unknown external stimulus, the computer program product comprising a non-transitory computer-readable medium with computer-readable instructions stored thereon, the said computer-readable instructions are executable by a computer having a processor for causing the processor to perform operations of:
   receiving a first input signal originating from a known external stimulus, the input signal having first spatial-temporal data;
   converting the spatial-temporal data into as first spike train;
   receiving the first spike train in a spiking neuron network, the spiking neuron network generating a first set of polychronous groups (PCGs) as a result of the first spike train;
   receiving a second input signal originating from an unknown external stimulus, the second input signal having, second spatial-temporal data;

converting the second spatial-temporal data into a second spike train;

receiving the second spike train in the spiking neuron network, the spiking neuron network generating a second set of PCGs as a result of the second spike train;

recognizing the second set of PCGs as being sufficiently similar to the first set of PCGs to identify the unknown external stimulus as the known external stimulus;

wherein in converting the spatial-temporal data into a first spike train, the first input signal is converted into frequency-specific spike patterns that are then combined based on a degree of synchrony to generate the first spike train; and wherein in receiving the first spike train in the spiking neuron network, the spiking neuron network is a hierarchical network, with a first layer having neurons that are tonotopically organized, such that spike trains from individual frequency bands are routed to neurons in the first layer according to the frequency hands to generate an initial group of PCGs, with the initial group of PCGs becoming an input to an upper layer in the hierarchical network to generate the first set of PCGs.

8. The computer program product as set forth in claim 7, wherein in converting the spatial-temporal data into a first spike train, a spatial component is represented by multiple channels that can carry spikes to neurons in a first layer of the spiking neuron network and a temporal component is represented by a timing of the spikes coming out of each channel, such that the timing of the spikes, a number of the spikes, and a location of each channel together encode the input signal into the first spike train.

9. The computer program product as set forth in claim 8, further comprising instructions for causing the processor to perform an operation of training a first layer of the readout neural network by pre-training with a random thalamic input and training with the first input signal originating from the known external stimulus.

10. The computer program product as set forth in claim 9, wherein pre-training allows synaptic weights to settle based on random network connections that are present and wherein training with the first input signal causes the synaptic weights to refine in response to the first input signal until the synaptic weights have a bimodal distribution in which weights concentrated at a maximum as a result of the pre-training migrate to a minimum, and where a histogram of synaptic weights becomes stable.

11. The computer program product as set forth in claim 10, wherein the operation recognizing the second set of PCGs as being sufficiently similar to the first set of PCGs is performed by a readout neural network.

12. The computer program product as set forth in claim 11, wherein the readout neural network is trained to allow readout neurons to fire according to an input pattern the recall system is exposed to, thereby performing a memory recall or input pattern classification function.

13. A computer implemented method for identifying, an unknown external stimulus, comprising acts of causing one or more processors to execute instructions encoded on a memory, such that upon execution, the one or more processors perform operations of:

receiving a first input signal originating from a known external stimulus, the first input signal having first spatial-temporal data;

converting the spatial-temporal data into a first spike train;

receiving the first spike train in a spiking neuron network, the spiking neuron network generating a first set of polychronous groups (PCGs) as a result of the first spike train;

receiving a second input signal originating from an unknown external stimulus, the second input signal having second spatial-temporal data;

converting the second spatial-temporal data into a second spike train;

receiving the second spike train in the spiking neuron network, the spiking neuron network generating a second set of PCGs as a result of the second spike train; and recognizing the second set of PCGs as being sufficiently similar to the first set of PCGs to identify the unknown external stimulus as the known external stimulus;

wherein in converting the spatial-temporal data into a first spike train, the first input signal is converted into frequency-specific spike patterns that are then combined based on a degree of synchrony to generate the first spike train; and wherein in receiving the first spike train in the spiking neuron network, the spiking neuron network is a hierarchical network, with a first layer having neurons that are tonotopically organized, such that spike trains from individual frequency hands are routed to neurons in the first layer according to the frequency bands to generate an initial group of PCGs, with the initial group of PCGs becoming an input to an upper layer in the hierarchical network to generate the first set of PCGs.

14. The computer implemented method as set forth in claim 13, wherein in converting the spatial-temporal data into a first spike train, a spatial component is represented by multiple channels that can carry spikes to neurons in a first layer of the spiking neuron network and a temporal component is represented by a timing of the spikes corning out of each channel, such that the timing of the spikes, a number of the spikes, and a location of each channel together encode the input signal into the first spike train.

15. The computer implemented method as set forth in claim 14, further comprising an act of training a first layer of the readout neural network by pre-training with a random thalamic input and training with the first input signal originating from the known external stimulus.

16. The computer implemented method as set forth in claim 15, wherein pre-training allows synaptic weights to settle based on random network connections that are present and wherein training with the first input signal causes the synaptic weights to refine in response to the first input signal until the synaptic weights have a bimodal distribution in which weights concentrated at a maximum as a result of the pre-training migrate to a minimum, and where a histogram of synaptic weights becomes stable.

17. The computer implemented method as set forth in claim 16, wherein the operation recognizing the second set of PCGs as being sufficiently similar to the first set of PCGs is performed by a readout neural network.

18. The computer implemented method as set forth in claim 17, wherein the readout neural network is trained to allow readout neurons to fire according to an input pattern the recall system is exposed to, thereby performing a memory recall or input pattern classification function.

\* \* \* \* \*